(12) United States Patent
Miyamoto

(10) Patent No.: US 10,908,436 B2
(45) Date of Patent: Feb. 2, 2021

(54) SPECTACLE LENS

(71) Applicant: NIKON-ESSILOR CO., LTD., Tokyo (JP)

(72) Inventor: So Miyamoto, Kawasaki (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 77 days.

(21) Appl. No.: 15/807,126

(22) Filed: Nov. 8, 2017

(65) Prior Publication Data

US 2018/0067339 A1    Mar. 8, 2018

Related U.S. Application Data

(63) Continuation of application No. PCT/JP2016/063738, filed on May 9, 2016.

(30) Foreign Application Priority Data

May 11, 2015    (JP) .................. 2015-096956

(51) Int. Cl.
| | | |
|---|---|---|
| G02C 3/00 | (2006.01) | |
| G02C 7/02 | (2006.01) | |
| G02C 7/10 | (2006.01) | |
| G02B 5/28 | (2006.01) | |
| G02B 1/115 | (2015.01) | |

(Continued)

(52) U.S. Cl.
CPC ............. G02C 7/104 (2013.01); G02B 1/041 (2013.01); G02B 1/115 (2013.01); G02B 1/116 (2013.01); G02B 5/28 (2013.01); G02B 5/285 (2013.01); G02C 7/10 (2013.01); G02C 7/107 (2013.01); G02C 7/108 (2013.01); *G02C 2202/16* (2013.01)

(58) Field of Classification Search
CPC .............. G02B 1/04; G02B 1/11; G02B 1/115
USPC ........... 351/159.01, 159.57, 159.62, 159.66; 359/601
See application file for complete search history.

(56) References Cited

U.S. PATENT DOCUMENTS

| | | |
|---|---|---|
| 8,481,148 B2 | 7/2013 | Adachi et al. |
| 2010/0020402 A1 | 1/2010 | Imura et al. |

(Continued)

FOREIGN PATENT DOCUMENTS

| | | |
|---|---|---|
| CN | 104115037 | 10/2014 |
| JP | 59-49501 | 3/1984 |

(Continued)

OTHER PUBLICATIONS

International Search Report dated Jul. 26, 2016 in corresponding International Patent Application No. PCT/JP2016/063738.

(Continued)

*Primary Examiner* — Mahidere S Sahle

(57) ABSTRACT

Provided is a spectacle lens (1) comprising one multilayer film (3a, 3b) on each surface of a plastic lens base material (2), wherein by setting an average reflection rate in at least the 530-570 nm wavelength range to 2.5-5.5% in at least one of the multilayer films (3a, 3b) disposed on a surface of the plastic lens base material, it is possible to attain, in dim environments, an improvement in vividness and brightness in visibility of objects, particularly those that are red in color, as well as an improvement in visibility of the white in white computer screens and the like, and the lens is thereby suitable for the eyes of elderly people.

13 Claims, 7 Drawing Sheets

(51) Int. Cl.
      *G02B 1/116*     (2015.01)
      *G02B 1/04*     (2006.01)

(56) References Cited

U.S. PATENT DOCUMENTS

| | | |
|---|---|---|
| 2014/0347625 A1 | 11/2014 | Tomoda et al. |
| 2015/0323705 A1 | 11/2015 | Hart et al. |

FOREIGN PATENT DOCUMENTS

| | | | |
|---|---|---|---|
| JP | 2003-248202 | 9/2003 | |
| JP | 2013-54275 | 3/2013 | |
| JP | 2013-61653 | 4/2013 | |
| JP | 2014-163950 | 9/2014 | |
| WO | WO-2013122253 A1 * | 8/2013 | ............... G02C 7/02 |
| WO | 2014/208412 A1 | 12/2014 | |

OTHER PUBLICATIONS

Chinese Office Action dated Dec. 24, 2018 in corresponding Chinese Application No. 201680026198.8, 7 pages.
European Office Action dated May 21, 2019 in corresponding European Patent Application No. 16792657.5 (5 pages).

* cited by examiner

SPECTACLE LENS

CROSS REFERENCE TO RELATED APPLICATIONS

This application is a continuation application of International Application No. PCT/JP2016/063738 filed on May 9, 2016, which claims priority under 35 U.S.C. 119(a) to Japanese Patent Application No. 2015-096956 filed on May 11, 2015, all of which are hereby expressly incorporated by reference into the present application.

TECHNICAL FIELD

The present invention relates to a spectacle lens having multilayer films separately on opposite surfaces of a plastic lens.

BACKGROUND ART

In recent years, plastic lenses are very often used in spectacle lenses because of their advantages including lightness in weight, excellent impact resistance and ease of dyeing.

Plastic lenses for spectacles are frequently subjected to uniform dyeing of the whole to a desired color or dyeing with a density gradient (gradation dyeing) for purposes such as a cosmetic effect, eye protection and a light shielding effect.

Moreover, in recent years, spectacle lenses having not only the cosmetic effect but also specific functions imparted by dyeing have been proposed (see Patent Literatures 1 and 2) and actively put on the market.

In particular, a lens which effectively cuts high energy blue light (380 nm to 500 nm) in the visible light is a main type of spectacle lens because it is effective in increasing the contrast while reducing eye strain.

Patent Literature 1 filed by the present applicant discloses a dyed lens which has excellent light absorption performance at short wavelengths of 380 nm to 450 nm and is obtained by dyeing with the use of a specific compound capable of effectively cutting only light at the short wavelengths of 380 nm to 450 nm.

Patent Literature 2 discloses a plastic spectacle lens which contains an organic dye having a main absorption peak between 565 nm and 605 nm in order to impart an anti-glare function for alleviating discomfort associated with glare caused by visible light, unclearness in contrast, ocular fatigue and the like.

The spectacle lens disclosed in Patent Literature 2 considerably decreases in transmittance at the main absorption peak wavelength ranging from 565 nm to 605 nm, and even the spectacle lenses disclosed in Examples and the like have a luminous transmittance Y of 14.1% to 73.4% and thus the luminous transmittance decreases considerably.

Therefore, the spectacle lens disclosed in Patent Literature 2 has a wavelength-selectively sharp light absorption peak at around 585 nm and hence can have excellent anti-glare performance and a contrast-enhancing effect, and as a result achieves good optical transparency at wavelengths other than around 585 nm owing to sharpness of the specific absorption peak and can ensure a bright field. Accordingly, an extremely good balance is struck between the anti-glare properties and visibility, and toning is easily performed to have various colors such as gray and brown.

CITATION LIST

Patent Literature

Patent Literature 1: JP 2013-054275 A
Patent Literature 2: JP 2013-061653 A

SUMMARY OF INVENTION

Technical Problems

However, human crystalline lenses are generally known to get colored yellow with aging. Therefore, as is clear from spectral luminous efficiency curves shown in FIG. 10, the luminous efficiency of human eyes decreases with aging in a blue light wavelength region of 380 nm to 500 nm.

Accordingly, middle-aged and elderly people, for example, those of 40 years old or above intrinsically cut blue light in the short wavelength region with their crystalline lenses having been got colored yellow. Therefore, there is a problem in that even when such middle-aged and elderly people use the spectacle lens disclosed in Patent Literature 1 in which blue light is effectively cut, which is a main type of spectacle lens, the use of the spectacle lens is expected to be less effective than for young people.

There is also a problem in that middle-aged and elderly people are not expected to perceive white, particularly white of a screen on a personal computer (PC) or the like, as clear white because their crystalline lenses got colored yellow.

In addition, as shown in FIG. 11, as is generally said, human eyes decrease in optical sensitivity and increase in required illuminance with aging. On the other hand, as shown in FIG. 12, a phenomenon that even if human eyes perceive red and blue at the same brightness in a bright place, red is perceived to be dustier and darker in a gloomy place is known as Purkinje phenomenon.

Therefore, there is a problem in that middle-aged and elderly people, for example, those of 40 years old or above see objects in a gloomy place less brightly than young people, and particularly vividness of red is lost and red is perceived to be dustier and darker.

The plastic spectacle lens disclosed in Patent Literature 2 has a considerably low luminous transmittance and hence can exhibit an anti-glare effect and other effects when used in an extremely bright environment of high illuminance; however, habitual use was not assumed, and there is a problem in that, when middle-aged and elderly people who require higher levels of illuminance wear the spectacles habitually, they have difficulty seeing and objects cannot be seen brightly in a gloomy place, and particularly vividness of red is further lost and red is perceived to be much dustier and darker.

The present invention has been made in view of the above situation and an object of the present invention is to provide a spectacle lens suitable to the eyes of middle-aged and elderly people.

To be more specific, an object of the present invention is to solve the foregoing problems associated with the conventional techniques and to provide a spectacle lens that allows middle-aged and elderly people wearing the relevant spectacles to see objects brightly and vividly even in a gloomy place and particularly to perceive red brightly as red is not impaired in its vividness, and also allows the middle-aged and elderly people to perceive white, for example, a white screen on a personal computer (particularly an LED backlight) to be whiter and as a result to more comfortably perform operations in which their eyes are to be fixed on white, for example, operations on a personal computer.

Solution to Problems

In order to achieve the above object, the present invention provides a spectacle lens having multilayer films provided separately on opposite surfaces of a plastic lens base, wherein an average reflectance of one of the multilayer films provided on at least one of the opposite surfaces of the plastic lens base in at least a wavelength range of 530 to 570 nm is 2.5 to 5.5%.

Preferably, a sum of average reflectances of the multilayer films provided separately on the opposite surfaces of the plastic lens base in at least the wavelength range of 530 to 570 nm is 3.0 to 6.0%.

Preferably, a luminous reflectance of one of the multilayer films provided on one of the opposite surfaces of the plastic lens base is 1.5 to 5.0%.

Preferably, one of the multilayer films provided on at least one of the opposite surfaces of the plastic lens base has one local maximum reflectance in at least the wavelength range of 530 to 570 nm, and the one local maximum reflectance is 2.0 to 6.0%.

Preferably, at least the wavelength range of 530 to 570 nm comprises a wavelength range of 530 to 580 nm.

Preferably, a sum of average reflectances of the multilayer films provided separately on the opposite surfaces of the plastic lens base in a wavelength range of 430 to 470 nm is 2.0% or less.

Preferably, a sum of average reflectances of the multilayer films provided separately on the opposite surfaces of the plastic lens base in a wavelength range of 630 to 670 nm is 2.0% or less.

Preferably, each of the multilayer films is composed of a high refractive index material and a low refractive index material, and a conductor film with a thickness of up to 20 nm or a metal film with a thickness of up to 20 nm is provided between the high refractive index material and the low refractive index material that are constituents of each of the multilayer films.

Preferably, the high refractive index material contains zirconium dioxide, and the low refractive index material contains silicon dioxide.

Preferably, each of the multilayer films is a multilayer film having three or more layers.

Preferably, a functional thin film is provided between the plastic lens base and each of the multilayer films.

Advantageous Effects of Invention

The present invention is configured as described above and therefore can provide a spectacle lens which is suitable to the eyes of middle-aged and elderly people.

Further, the invention which is configured as described above allows middle-aged and elderly people wearing the relevant spectacles to see objects brightly and vividly even in a gloomy place and particularly to perceive red brightly as red is not impaired in its vividness, and also allows the middle-aged and elderly people to perceive white, for example, a white screen on a personal computer (particularly an LED backlight) to be whiter and as a result to more comfortably perform operations in which their eyes are to be fixed on white, for example, operations on a personal computer.

DESCRIPTION OF EMBODIMENTS

A spectacle lens according to the present invention is described below in detail based on preferred embodiments shown in the accompanying drawings.

The preferred embodiments illustrated below serve to specifically describe the invention so that the scope of the invention can be further understood, and the invention should not be construed as being limited to these embodiments unless otherwise specified.

Figure 1:
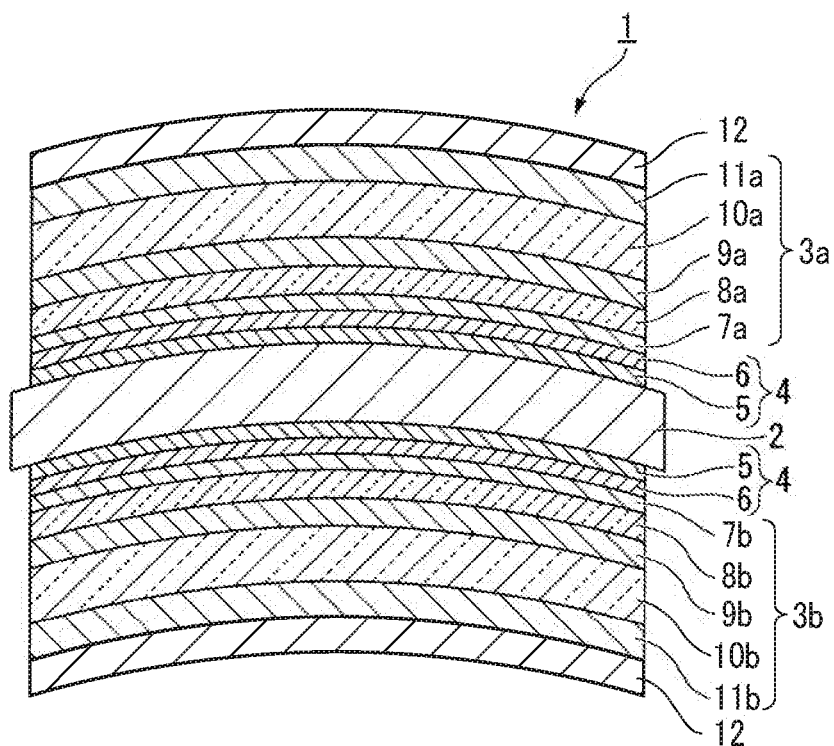
FIG. 1 is a schematic view showing an example of a spectacle lens according to one embodiment of the invention.

FIG. 1 is a cross-sectional side view schematically showing an example of a spectacle lens according to one embodiment of the invention.

A spectacle lens 1 shown in the drawing includes a plastic lens base (hereinafter called "plastic base") 2, an optical multilayer film 3a provided at the front surface (top surface; a surface on the opposite side from an eyeball (outer side)) of the plastic base 2 and an optical multilayer film 3b provided at the back surface (bottom surface; a surface on the eyeball side (human face side)) of the plastic base 2.

In the spectacle lens 1 of this embodiment, preferably, functional thin films 4 are provided separately between the front surface of the plastic base 2 and the optical multilayer film 3a and between the back surface of the plastic base 2 and the optical multilayer film 3b. The functional thin film 4 is made up of a primer layer 5 and a hard coating layer 6.

In this embodiment, a water and oil repellent film 12 is preferably provided on each of the optical multilayer films 3a and 3b. The water and oil repellent film 12 is described later.

The plastic base 2 is formed of, for example, any of transparent plastics such as acrylic resin, thiourethane resin, methacrylic resin, allyl resin, episulfide resin, polycarbonate resin, polyurethane resin, polyester resin, polystyrene resin, episulfide resin, polyethersulfone resin, poly-4-methylpentene-1 resin, diethylene glycol bis(allyl carbonate) resin (CR-39), polyvinyl chloride resin, allyl diglycol carbonate resin, halogen-containing copolymer, and sulfur-containing copolymer.

In this embodiment, for the refractive index (nd) of the plastic base 2, a refractive index selected from, for example, 1.50, 1.55, 1.60, 1.67, 1.70 and 1.74 is used. When the refractive index of the plastic base 2 is set to 1.6 or more, allyl carbonate resin, acrylate resin, methacrylate resin, thiourethane resin, episulfide resin and the like are preferably used for the plastic base 2.

The plastic base 2 need not be transparent as long as it is translucent, and may be colored. A colored plastic base 2 preferably has a transmittance of 5 to 85%.

The functional thin films 4, which are provided separately between the plastic base 2 and the optical multilayer film 3a and between the plastic base 2 and the optical multilayer film 3b as described above, are each made up of the primer layer 5 located adjacent to the plastic base 2 and the hard coating layer 6 located adjacent to the primer layer 5 and also to the optical multilayer film 3a or 3b.

The primer layer 5 enhances the adhesion between the plastic base 2 and the hard coating layer 6 and serves as an adhesive layer. In addition, the primer layer 5 absorbs an impact acting on the spectacle lens 1 and serves also as an impact absorbing layer.

The primer layer 5 is primarily composed of polyurethane resin and, in this embodiment, fine particles of an optical material are added to the polyurethane resin, for instance. The primer layer 5 may contain at least one of acrylic resin, methacrylic resin and organosilicon resin. The thickness (actual thickness) of the primer layer 5 is preferably about 0.5 μm or more but about 1.0 μm or less.

The primer layer 5 as above can be formed to a predetermined thickness on the plastic base 2 by immersing the plastic base 2 in a formation material liquid for the primer layer 5 and then pulling out the plastic base 2, followed by drying. A usable example of the formation material liquid for the primer layer 5 is a liquid obtained by dispersing or dissolving the foregoing resin that is to be the primer layer 5 as well as a sol of optical oxide fine particles in water or an alcoholic solvent and mixing them.

The hard coating layer 6 serves to protect the plastic base 2 and reduce damage of the plastic base 2, and preferably serves as an abrasion resistant film such as a silicone hard coating film improving abrasion resistance.

The hard coating layer 6 comprises, for instance, an organosiloxane hard coating layer as the silicone hard coating film improving abrasion resistance. The organosiloxane hard coating layer is obtained by dispersing optical oxide fine particles in organosiloxane resin. Favorable examples of the optical oxide for use include a rutile-type titanium oxide and oxides of silicon, tin, zirconium and antimony. The hard coating layer 6 may be composed of organosilicon resin containing colloidal silica as disclosed in, for example, JP 4-55615 B. The thickness (actual thickness) of the hard coating layer 6 is preferably about 2 μm or more but about 4 μm or less.

The hard coating layer 6 is not particularly limited and may be a known hard coating layer such as a urethane hard coating layer for improving the impact resistance.

The hard coating layer 6 can be formed to a predetermined thickness on the primer layer 5 disposed on the plastic base 2 by immersing the plastic base 2 having the primer layer 5 thereon in a formation material liquid for the hard coating layer 6 and then pulling out the plastic base 2, followed by drying. A usable example of the formation material liquid for the hard coating layer 6 is a liquid obtained by dispersing or dissolving the foregoing resin that is to be the hard coating layer 6 and a sol of optical oxide fine particles in water or an alcoholic solvent and mixing them.

When the functional thin film 4 including the primer layer 5 and the hard coating layer 6 has the substantially same refractive index as that of the plastic base 2, it is possible to suppress the generation of interference fringes caused by reflection at the interface between the functional thin film 4 and the plastic base 2 and to prevent the transmittance from decreasing. Therefore, the refractive index of the functional thin film 4 is preferably adjusted in accordance with the refractive index of the plastic base 2. The refractive index of the functional thin film 4 (the primer layer 5 and the hard coating layer 6) can be adjusted by selecting the type (physical properties) of resin that is the main ingredient of the functional thin film 4 or by selecting the type (physical properties) of fine particles to be added to the resin that is the main ingredient.

While the functional thin film 4 is made up of the primer layer 5 and the hard coating layer 6 in this embodiment, one or both of the primer layer 5 and the hard coating layer 6 may be omitted, for example. The functional thin film 4 may include, in addition to the primer layer 5 and the hard coating layer 6 described above, a conductor film made of ITO (indium tin oxide, which is also called tin-doped indium oxide) and other components, a metal film made of Ni, Cr or the like, and a visible light absorption layer as constituent films, for example.

While it is preferable for the spectacle lens of this embodiment to have the same functional thin films 4 separately between the front surface of the plastic base 2 and the optical multilayer film 3a and between the back surface of the plastic base 2 and the optical multilayer film 3b, the invention is not limited thereto, and functional thin films different from each other may be separately provided on the front surface and the back surface of the plastic base 2.

In this embodiment, a conductor film made of ITO or the like, a metal film made of Ni, Cr or the like, a visible light absorption film, or another film, with a thickness of up to 20 nm may be provided between a high refractive index optical material and a low refractive index optical material that constitute each of the optical multilayer films 3a and 3b. The conductor film, the metal film or the visible light absorption film may have a thickness of 10 nm or less.

The conductor film, the metal film and the visible light absorption film have higher electric conductivity and absorb more visible light to cause coloring, as compared to an oxide that is the high refractive index optical material used in the multilayer films of this embodiment, therefore cannot be employed as the high refractive index optical material used in the multilayer films of this embodiment, are clearly distinguished from the high refractive index optical material and are not included in the high refractive index optical material used in the multilayer films of this embodiment.

The optical multilayer films 3a and 3b each have a multilayer structure in which plural high refractive index optical materials (high refractive index substance) and plural low refractive index optical materials (low refractive index substance) are alternately stacked, more specifically, at least four layers including high refractive index layers made of the high refractive index substance and low refractive index layers made of the low refractive index substance are stacked, and the optical multilayer films serve as antireflection films for preventing the reflection of incident light.

In this embodiment, at least one of the optical multilayer films 3a and 3b provided separately on the opposite surfaces of the plastic base 2, i.e., the optical multilayer film 3a or 3b is designed to have an average reflectance of 2.5% to 5.5% in the wavelength range of at least 530 nm to 570 nm and preferably 530 nm to 580 nm (green light).

The optical multilayer films 3a and 3b are preferably designed such that the sum of their average reflectances in the wavelength range of at least 530 nm to 570 nm and preferably 530 nm to 580 nm (green light) is 3.0% to 6.0%.

The average reflectance of at least one of, i.e., either of the optical multilayer films 3a and 3b in the above wavelength ranges is limited to that falling within the range of 2.5% to 5.5% for the following reasons:

When the average reflectance of either one is set to not less than 2.5% but not more than 5.5%, the spectacle lens 1 of this embodiment having the optical multilayer films 3a and 3b allows middle-aged and elderly people wearing the relevant spectacles to see objects brightly and vividly even in a gloomy place and particularly to perceive red brightly as red is not impaired in its vividness, and also allows the middle-aged and elderly people to perceive white, for example, a white screen on a personal computer (particularly an LED (Light Emitting Diode) backlight) to be whiter and as a result to more comfortably perform operations in which their eyes are to be fixed on white, for example, operations on a personal computer.

In contrast, when the average reflectance in the above wavelength ranges is set to less than 2.5%, a person using the relevant spectacle lens cannot obtain the foregoing effects because of too low reflectance and thus too low reflection, and therefore hardly feels those effects. When the average reflectance is set to more than 5.5%, a person using the relevant spectacle lens should feel that the reflection of the spectacle lens is too strong because of too high reflectance, and therefore feels annoyed and uncomfortable with the reflection in sight.

When the sum of the average reflectances of the optical multilayer films 3a and 3b is set to not less than 3.0% but not more than 6.0%, the foregoing various effects obtained through the spectacle lens 1 of this embodiment are further enhanced.

The spectacle lens 1 of this embodiment is, in addition to the above limitations, limited in that at least one of the optical multilayer films 3a and 3b provided on at least one of the opposite surfaces of the plastic base 2 has one local maximum reflectance in the wavelength range of at least 530 to 570 nm and preferably 530 nm to 580 nm, and the local maximum reflectance is preferably 2.0% to 6.0%.

Figure 2:
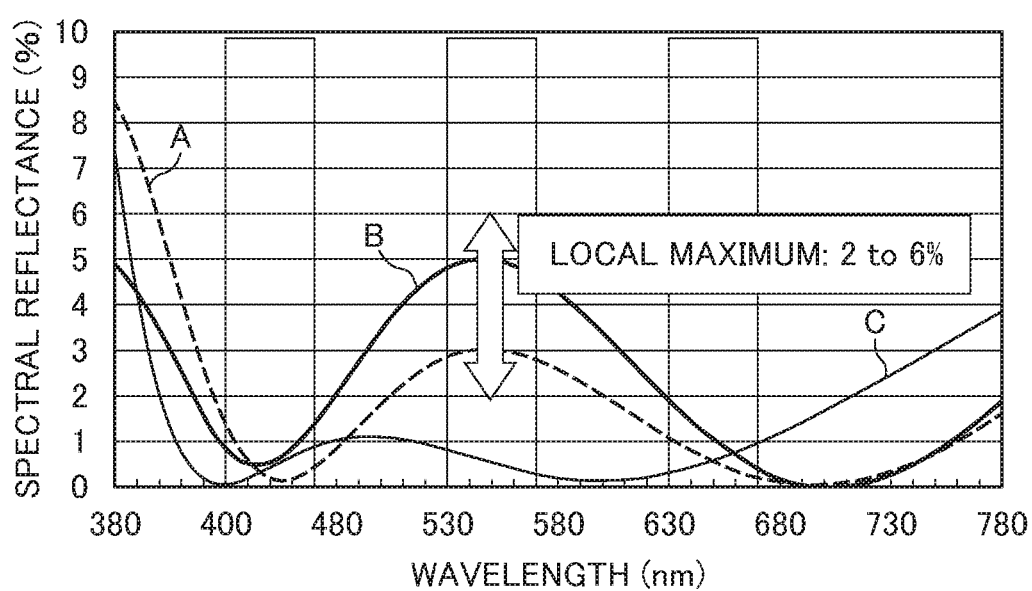
FIG. 2 is a graph showing reflection spectral characteristics of three types of multilayer film of the spectacle lens according to one embodiment of the invention.

In other words, it is preferable that at least one of the optical multilayer films 3a and 3b have one local maximum reflectance in the wavelength range of 530 to 570 nm and preferably 530 nm to 580 nm and that the local maximum reflectance be not less than 2.0% but not more than 6.0%, as can be seen from reflection spectral characteristics (spectral reflectance curves) A and B in FIG. 2.

This is because when a local maximum reflectance is present in the above wavelength ranges and the local maximum reflectance falls within the range of 2.0 to 6.0%, green light can be selectively cut, which leads to a filtering effect, thereby obtaining the foregoing effects.

In the spectacle lens 1 of this embodiment, it is more preferable that each of the optical multilayer films 3a and 3b have a local maximum reflectance in the wavelength range of 530 to 570 nm and preferably 530 nm to 580 nm and that the local maximum reflectance be not less than 2.0% but not more than 6.0%.

Meanwhile, an antireflection film for general spectacle lenses that has low reflection spectral characteristics (wideband low reflection characteristics) over the entire visible range of 380 nm to 780 nm does not have any local maximum reflectance in the wavelength range of 530 to 570 nm, with the reflectance itself being less than 2.0%, as can be seen from reflection spectral characteristics C in FIG. 2.

Note that the reflection spectral characteristics A and B shown in FIG. 2 are reflection spectral characteristics of optical multilayer films 3a on the front surfaces of spectacle lenses 1 in Examples 1 and 2, respectively, while the reflection spectral characteristics C shown in FIG. 2 are reflection spectral characteristics of optical multilayer films 3b on the back surfaces of the spectacle lenses 1 in Examples 1 and 2, which are described later in detail.

It is evident from the combination of the reflection spectral characteristics A and C in Example 1 and the combination of the reflection spectral characteristics B and C in Example 2 that the sum of the average reflectances of the optical multilayer films 3a and 3b in the wavelength range of 530 to 570 nm falls within the range of 3.0 to 6.0. It can also be seen from the reflection spectral characteristics B in Example 2 that the average reflectance of the optical multilayer film 3a alone in the wavelength range of 530 to 570 nm falls within the range of 3.0 to 6.0.

In the spectacle lens 1 of this embodiment, at least one of the optical multilayer films 3a and 3b provided on at least one of the opposite surfaces of the plastic base 2 preferably has a luminous reflectance of 1.5% to 5.0%, the luminous reflectance being the reflectance over the entire visible range, particularly the range of about 430 nm to about 670 nm.

This is because when the luminous reflectance of at least one (even only one) of the optical multilayer films 3a and 3b is limited to a relatively low value falling within the range of 1.5% to 5.0% over the entire visible range, the foregoing effects can be easily obtained. With a luminous reflectance of less than 1.5%, the foregoing effects are hardly felt, while with a luminous reflectance of more than 5.0%, a person wearing the relevant spectacles may feel that the reflection of the spectacle lens is too strong and therefore feel uncomfortable.

In the spectacle lens 1 of this embodiment, since glare of reflection that a person wearing the relevant spectacles experiences can be suppressed as long as the luminous reflectance of one of the optical multilayer films 3a and 3b falls within the specified range of 1.5% to 5.0%, it is preferable for the other of the films to be a low reflection multilayer film as a spectacle lens.

In addition to the above limitations, the spectacle lens 1 of this embodiment is preferably configured such that the sum of the average reflectances of the optical multilayer films 3a and 3b provided separately on the opposite surfaces of the plastic base 2 in the wavelength range of 430 to 470 nm is not more than 2.0%.

This is because when the sum of the average reflectances exceeds 2.0%, a yellowish tint is perceived comparatively intensely, and a person wearing the relevant spectacles hardly feels the foregoing effects.

In addition to the above limitations, the spectacle lens 1 of this embodiment is preferably configured such that the sum of the average reflectances of the optical multilayer films 3a and 3b provided separately on the opposite surfaces of the plastic base 2 in the wavelength range of 630 nm to 670 nm is not more than 2.0%.

This is because when the sum of the average reflectances exceeds 2.0%, a bluish tint is perceived, and a person wearing the relevant spectacles hardly feels the foregoing effects.

The optical multilayer film 3a in the illustrated example, which is provided on the plastic base 2, has a five-layer structure in which five layers in total including the high refractive index optical materials and the low refractive index optical materials are alternately stacked and is composed of a first layer (low refractive index layer) 7a comprising the low refractive index optical material located on the plastic base 2 side, a second layer (high refractive index layer) 8a comprising the high refractive index optical material disposed on the first layer 7a, a third layer (low refractive index layer) 9a comprising the low refractive index optical material disposed on the second layer 8a, a fourth layer (high refractive index layer) 10a comprising the high refractive index optical material disposed on the third layer 9a, and a fifth layer (low refractive index layer) 11a comprising the low refractive index optical material disposed on the fourth layer 10a.

The optical multilayer film 3b in the illustrated example, which is provided on the plastic base 2, also has a five-layer structure in which five layers in total including the high refractive index optical materials and the low refractive index optical materials are alternately stacked and is composed of a first layer (low refractive index layer) 7b comprising the low refractive index optical material located on the plastic base 2 side, a second layer (high refractive index layer) 8b comprising the high refractive index optical material disposed on the first layer 7b, a third layer (low refractive index layer) 9b comprising the low refractive index optical material disposed on the second layer 8b, a fourth layer (high refractive index layer) 10b comprising the high refractive index optical material disposed on the third layer 9b, and a fifth layer (low refractive index layer) 11b comprising the low refractive index optical material disposed on the fourth layer 10b.

In this embodiment, the optical multilayer films 3a and 3b are not particularly limited as long as they are provided separately on the front and back surfaces of the plastic base 2 and each have the structure in which three or more layers including the high refractive index optical material(s) and the low refractive index optical material(s) are alternately stacked. The number of layers in each of the optical multilayer films above is not limited but, for use in a spectacle lens, is preferably 3 to 12, more preferably 4 to 10 and still more preferably 5 to 8. In designing an optical multilayer film for spectacle lenses, the optical multilayer film is preferably and typically designed so that the number of layers therein is about 3 to about 12.

Three or more layers are stacked in each of the optical multilayer films 3a and 3b because, if the number of layers is less than three, the high refractive index optical materials and the low refractive index optical materials cannot be alternately stacked, and when the number of layers is 12 or less, desired spectral reflectance characteristics can be achieved while maintaining sufficient productivity.

In the example shown in FIG. 1, each of the optical multilayer films 3a and 3b has the five-layer structure in which five layers including the high refractive index optical materials and the low refractive index optical materials are alternately stacked; however, the invention is not limited thereto, and the optical multilayer films 3a and 3b may be different from each other in the number and the order of stacked layers as long as the high refractive index layers made of the high refractive index optical material and the low refractive index layers made of the low refractive index optical material are alternately stacked.

As shown in FIG. 1, the first layers 7a and 7b are separately provided adjacent to the hard coating layers 6 and are low refractive index layers made of silicon dioxide ($SiO_2$) with a refractive index of 1.47. Other than $SiO_2$, $MgF_2$ with a refractive index of 1.36 may also be used as the low refractive index optical material composing the first layers 7a and 7b, for example.

The low refractive index layer in this embodiment is a layer made of a low refractive index optical material with a refractive index of preferably not more than 1.50 and more preferably 1.30 to 1.50.

In designing an optical multilayer film for spectacle lenses, the optical multilayer film is preferably and typically designed so that the optical thickness of the low refractive index layer as above falls within the range of $0.030\lambda$ to $1.000\lambda$.

At this time, the central wavelength is preferably designed to be 400 to 600 nm.

As shown in FIG. 1, the second layers 8a and 8b are provided adjacent to the first layers 7a and 7b, respectively, and are high refractive index layers made of zirconium dioxide ($ZrO_2$) with a refractive index of 2.00. Other than $ZrO_2$, titanium dioxide ($TiO_2$) or tantalum dioxide ($Ta_2O_5$) may also be used as the high refractive index optical material composing the second layers 8a and 8b, for example. Furthermore, the second layers may be made of an oxide of alloy of plural metals such as zirconium, titanium and tantalum. In addition to the above, aluminum oxide ($Al_2O_3$), yttrium dioxide ($Y_2O_3$), hafnium dioxide ($HfO_2$) or $Nb_2O_5$ (niobium dioxide) may also be used, for example.

It can also be said that the high refractive index layer in this embodiment is a layer made of a high refractive index optical material with a refractive index of preferably not less than 1.60 and more preferably 1.80 to 2.40, for example.

In designing an optical multilayer film for spectacle lenses, the optical multilayer film is preferably and typically designed so that the optical thickness of the high refractive index layer as above also falls within the range of $0.030\lambda$ to $1.000\lambda$.

The third layers 9a and 9b are provided adjacent to the second layers 8a and 8b, respectively, and are low refractive index layers made of silicon dioxide ($SiO_2$) with a refractive index of 1.47 as with the first layers 7a and 7b. Similarly to the first layers 7a and 7b, other low refractive index optical materials than $SiO_2$ may also be used to form the third layers 9a and 9b.

The fourth layers 10a and 10b are provided adjacent to the third layers 9a and 9b, respectively, and are high refractive index layers made of zirconium dioxide ($ZrO_2$) as with the second layers 8a and 8b. Similarly to the second layers 8a and 8b, other high refractive index optical materials than $ZrO_2$ may also be used to form the fourth layers 10a and 10b.

The fifth layers 11a and 11b are provided adjacent to the fourth layers 10a and 10b, respectively, and are low refractive index layers made of silicon dioxide ($SiO_2$) with a refractive index of 1.47 as with the second layers 8a and 8b. Similarly to the first layers 7a and 7b, other low refractive index optical materials than $SiO_2$ may also be used to form the fifth layers 11a and 11b.

In this embodiment, as described above, the water and oil repellent film 12 including a fluorine-substituted, alkyl group-containing organosilicon compound is provided on each of the optical multilayer films 3a and 3b, that is, each of the outermost layers (the fifth layers 11a and 11b being the low refractive index layers) of the optical multilayer films 3a and 3b, with the outermost layers being located farthest from the plastic base 2.

The water and oil repellent film 12 is primarily composed of the fluorine-substituted, alkyl group-containing organosilicon compound and has liquid repellency (water repellency and oil repellency). Specifically, the water and oil repellent film 12 decreases back surface energy of the spectacle lens 1 to exhibit functions of water mark-, fogging- and stain-prevention and improves sliding properties of the back surface of the spectacle lens whereby abrasion resistance can be improved.

For the fluorine-substituted, alkyl group-containing organosilicon compound, one formula is selected from General Formula (1):

[Chemical Formula 1]

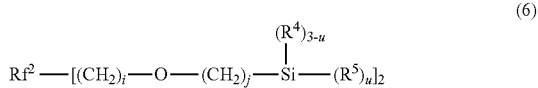

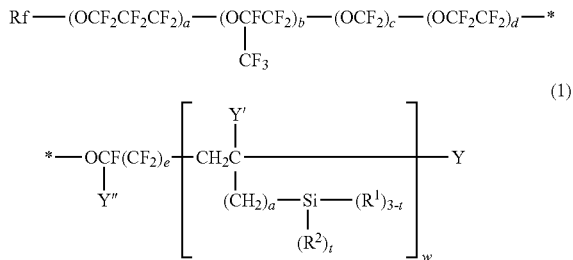

(1)

(in Formula (1), Rf represents a linear or branched perfluoroalkyl group with 1 to 16 carbon atoms, Y represents iodine or hydrogen, Y' represents hydrogen or a lower alkyl group with 1 to 5 carbon atoms, Y" represents fluorine or trifluoromethyl group, $R^1$ represents a hydrolyzable group, $R^2$ represents hydrogen or an inert monovalent organic group, each of a, b, c and d represents an integer of 0 to 200, e represents 0 or 1, each of s and t represents an integer of 0 to 2, and w represents an integer of 1 to 10), General Formulae (2) to (5):

[Chemical Formula 2]

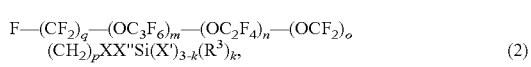

(2)

[Chemical Formula 3]

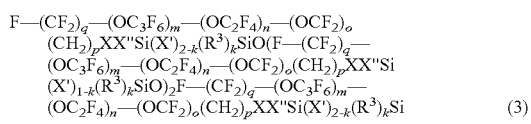

(3)

[Chemical Formula 4]

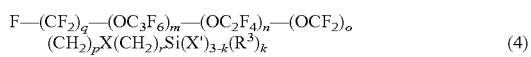

(4)

[Chemical Formula 5]

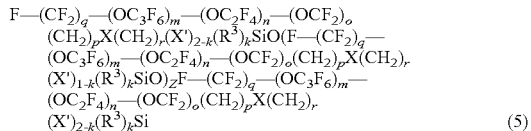

(5)

(in Formulae (2) to (5), X represents oxygen or a divalent organic group, X' represents a hydrolyzable group, X" represents a divalent organic silicone group, $R^3$ represents a linear or branched alkylene group with 1 to 22 carbon atoms, q represents an integer of 1 to 3, each of m, n and o represents an integer of 0 to 200, p represents 1 or 2, r represents an integer of 2 to 20, k represents an integer of 0 to 2, and z represents an integer of 0 to 10 when k is 0 or 1) and General Formula (6):

[Chemical Formula 6]

$$Rf^2 — [(CH_2)_i — O — (CH_2)_j — \overset{(R^4)_{3-u}}{\underset{|}{Si}} — (R^5)_u]_2$$

(6)

(in Formula (6), $Rf^2$ represents a linear divalent perfluoropolyether group, $R^4$ represents an alkyl group with 1 to 4 carbon atoms or phenyl group, $R^5$ represents a hydrolyzable group, i represents an integer of 0 to 2, j represents an integer of 1 to 5, and u represents 2 or 3).

In order to impart excellent durability to the water and oil repellent film 12, it is preferable to use a fluorine-substituted, alkyl group-containing organosilicon compound selected from General Formulae (1) to (5) and a fluorine-substituted, alkyl group-containing organosilicon compound selected from General Formula (6) in combination.

For the fluorine-substituted, alkyl group-containing organosilicon compounds expressed by General Formulae (1) to (5), OPTOOL DSX and OPTOOL AES4 manufactured by Daikin Industries, Ltd. may be used, for example. For the fluorine-substituted, alkyl group-containing organosilicon compound expressed by General Formula (6), KY-130 and KY-164 manufactured by Shin-Etsu Chemical Co., Ltd. may be used, for example.

[Method of Manufacturing Spectacle Lens]

Next, one example of a method of manufacturing a spectacle lens according to this embodiment is described. In the following, a description is given based on a method of manufacturing the foregoing spectacle lens 1 in which the optical multilayer films 3a and 3b are separately provided on the opposite sides as shown in FIG. 1.

The manufacturing method of this embodiment involves a step of forming the functional thin film 4 (the primer layer 5 and the hard coating layer 6) on each of the front and back surfaces of the plastic base 2 by a known method, a step of heating the plastic base 2, a step of forming the optical multilayer films 3a and 3b separately on the opposite surfaces of the plastic base 2 having been adjusted to a predetermined temperature (e.g., 70° C.) through the heating, and a step of forming the water and oil repellent films 12 separately on the optical multilayer films 3a and 3b.

The step of forming the optical multilayer films 3a and 3b is a process for forming a film having a multilayer structure by alternately stacking plural layers including the high refractive index optical materials and the low refractive index optical materials, that is, a process for sequentially forming the low refractive index layers being the first layers 7a and 7b made of the low refractive index optical material, the high refractive index layers being the second layers 8a and 8b made of the high refractive index optical material thereon, the low refractive index layers being the third layers 9a and 9b thereon, thick films that are the high refractive index layers being the fourth layers 10a and 10b thereon, and the low refractive index layers being the fifth layers 11a and 11b thereon. Vacuum evaporation is favorably employed to form the first to fifth layers.

Figure 3:
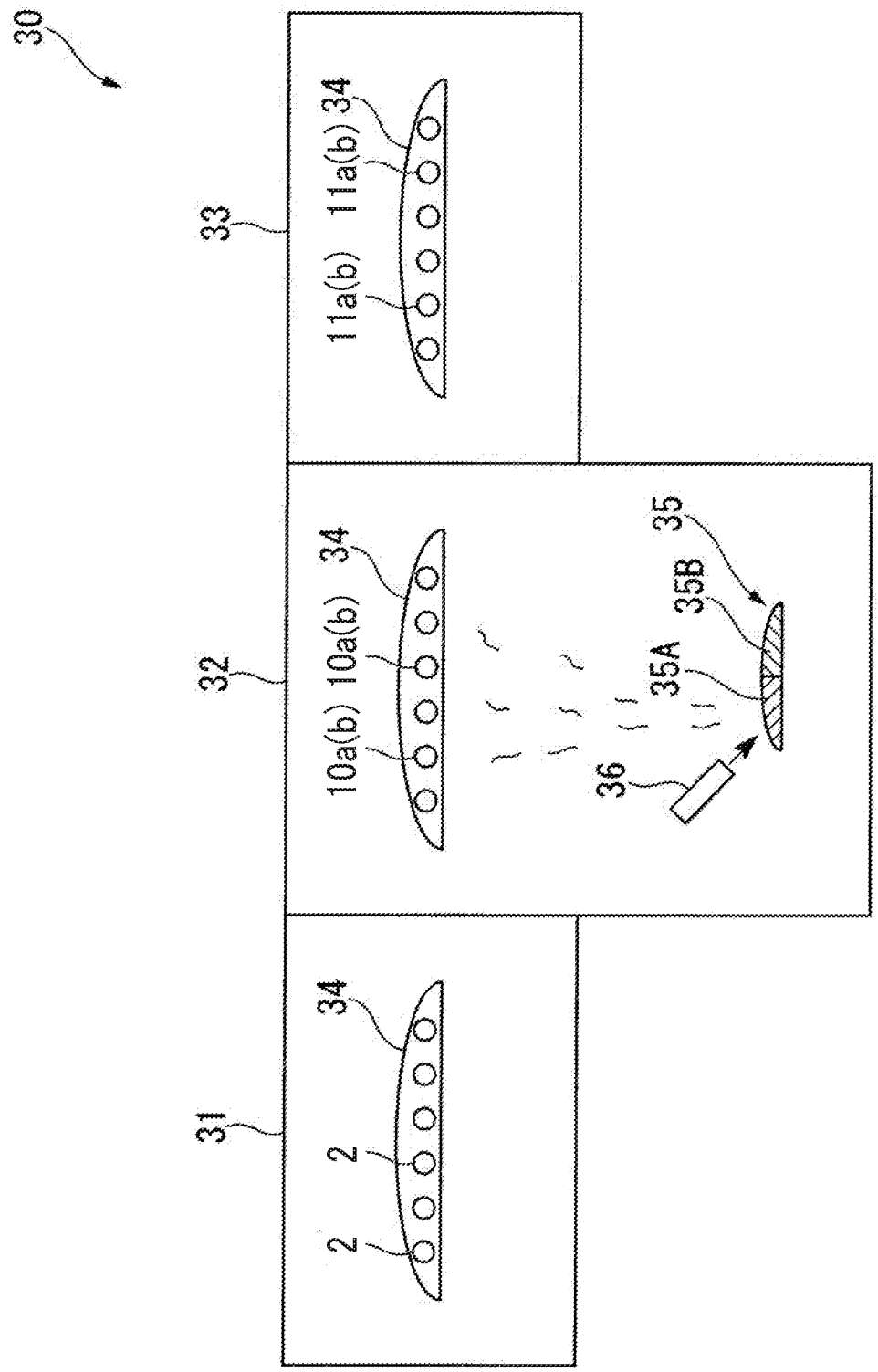
FIG. 3 is a schematic view showing an embodiment of a vacuum evaporation device for manufacturing the spectacle lens according to one embodiment of the invention.

FIG. 3 is a view showing one example of a vacuum evaporation device (hereinafter also simply called "evaporation device") 30 used to form the layers 7a and 7b to 11a and 11b of the optical multilayer films 3a and 3b. As shown in FIG. 3, the evaporation device 30 includes a first film formation chamber 31, a second film formation chamber 32 and a third film formation chamber 33. The first film formation chamber 31, the second film formation chamber 32 and the third film formation chamber 33 are configured such that the internal pressure of each is reduced to nearly a vacuum level and kept in that state. When the optical multilayer films 3a and 3b for the spectacle lens 1 of this embodiment are formed with the vacuum evaporation device 30, the evaporation is typically and preferably performed in a vacuum with an evaporation pressure of about $1.0 \times 10^3$ Pa to about $1.0 \times 10^{-4}$ Pa.

In the evaporation device 30, the internal temperatures of the first film formation chamber 31, the second film formation chamber 32 and the third film formation chamber 33 are adjustable using temperature adjusting means (not shown).

The evaporation device 30 has a retention member 34 in the interior space of each of the first film formation chamber 31, the second film formation chamber 32 and the third film formation chamber 33. The retention member 34 has the top surface (retaining surface) of curved shape, is rotatable and retains a plurality of the plastic bases 2 on its top surface.

An evaporation source 35 of the evaporation device 30 is disposed in the interior space of the second film formation chamber 32. The evaporation source 35 is made up of a first evaporation source 35A and a second evaporation source 35B. The second film formation chamber 32 has therein a light source device 36 capable of irradiating the evaporation source 35 with a beam. The light source device 36 irradiates the evaporation source 35 with electrons to sputter constituent particles of the evaporation source 35.

Upon irradiation of the evaporation source 35 with electrons emitted from the light source device 36, a material (gas) used to form the optical multilayer films 3a and 3b is ejected from the evaporation source 35.

For instance, the light source device 36 irradiates the second evaporation source 35B with a beam to cause the second evaporation source 35B to eject $SiO_2$ vapor and supply and deposit the ejected vapor on the opposite surfaces of each plastic base 2 retained by the retention member 34. Thus, the first layers 7a and 7b, the third layers 9a and 9b and the fifth layers 11a and 11b, which are the low refractive index layers of the optical multilayer films 3a and 3b, can be formed. Similarly, the light source device 36 irradiates the first evaporation source 35A with a beam to cause the first evaporation source 35A to eject $ZrO_2$ vapor and supply and deposit the ejected vapor on the opposite surfaces of each plastic base 2 retained by the retention member 34. Thus, the second layers 8a and 8b and the fourth layers 10a and 10b, which are the high refractive index layers of the optical multilayer films 3, can be formed.

More specifically, by alternately performing the irradiation of the first evaporation source 35A with a beam and the irradiation of the second evaporation source 35B with a beam, the layers made of the high refractive index optical material and the layers made of the low refractive index optical material can be alternately formed and stacked separately on the opposite surfaces of each plastic base 2 retained by the retention member 34. In this embodiment, the optical multilayer films 3a and 3b are formed separately on the opposite surfaces of each plastic base 2 such that the sum of the average reflectances of the films in the wavelength range of 530 to 570 nm is 3.0 to 6.0%.

In this process, using an evaporation source composed of zirconium oxide (ZrO) as the first evaporation source 35A, the first evaporation source 35A may be irradiated with a beam as introducing oxygen to the interior space of the second film formation chamber 32 to thereby form the high refractive index optical material layers composed of zirconium dioxide ($ZrO_2$).

In the method of manufacturing a spectacle lens according to this embodiment, the step of forming the optical multilayer films 3a and 3b may involve a step of forming, out of the layers constituting the optical multilayer films 3a and 3b, at least one layer by ion-beam assisted deposition. When the method of manufacturing a spectacle lens according to this embodiment includes this step, a conductor film made of ITO or a metal is provided between a high refractive index optical material and a low refractive index optical material that are constituents of the optical multilayer films.

Figure 4:
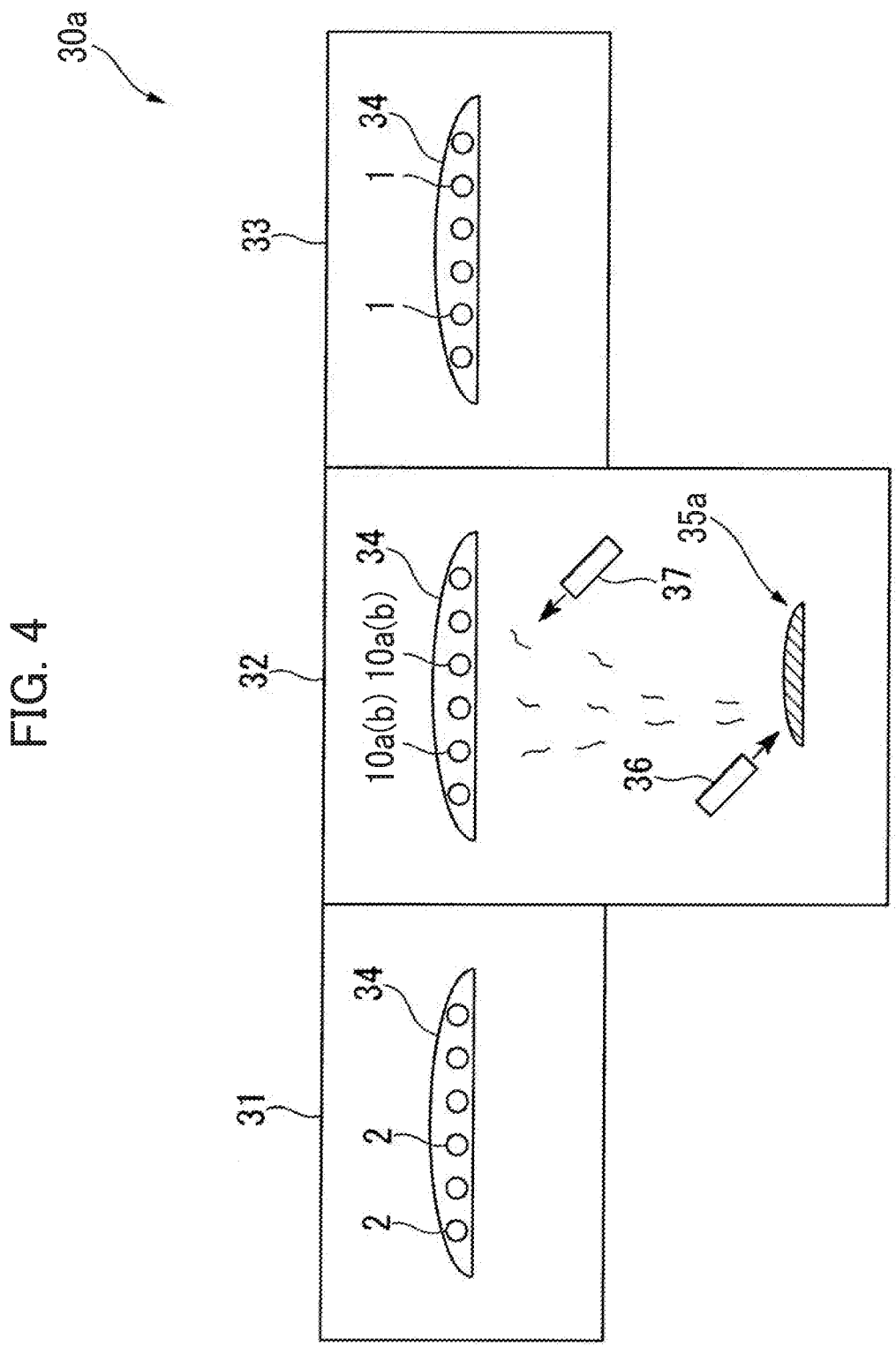
FIG. 4 is a schematic view showing an embodiment of a film formation device for manufacturing the spectacle lens according to one embodiment of the invention.

FIG. 4 is a view showing one example of a film formation device 30a used in ion-beam assisted deposition. The film formation device 30a has the configuration in which the second film formation chamber of the vacuum evaporation device 30 shown in FIG. 3 is equipped with an ion gun 37. In FIG. 4, constituent elements identical to those of the vacuum evaporation device 30 shown in FIG. 3 are assigned by the same reference signs and will not be described.

In this embodiment, ion-beam assisted deposition is carried out to form a conductor film made of ITO or a metal between each of the fourth layers 10a and 10b being the high refractive index layers and the associated one of the fifth layers 11a and 11b being the low refractive index layers, which are constituents of the optical multilayer films 3a and 3b.

It suffices if ion-beam assisted deposition is carried out in the film formation chamber 32 to form, of the layers constituting the optical multilayer films 3a and 3b, at least one layer, and not only the conductor film but also other types of films may be formed by ion-beam assisted deposition.

In this embodiment, the second film formation chamber of the film formation device 30a is mainly composed of the retention member 34 retaining the plastic bases 2 on each of which the fourth layers 10a and 10b have been formed, an evaporation source 35a, the ion gun 37 placed away from the evaporation source 35a, and the light source device 36.

As with the vacuum evaporation device 30, the film formation device 30a is configured such that the internal pressure thereof can be reduced to nearly a vacuum level and a vacuum atmosphere can be maintained around each plastic base 2. In addition, the film formation device 30a is connected to an atmospheric gas supply source such as a gas cylinder so as to establish, in a vacuum container, an atmosphere of oxygen gas, argon gas or another inert gas or an oxygen-containing inert gas atmosphere in a low pressure state such as a vacuum state.

The evaporation source 35a includes ITO, for instance. When the light source device 36 irradiates the evaporation source 35a with a beam, gasified ITO is ejected from the evaporation source 35a and supplied to each plastic base 2 retained by the retention member 34. As a result, conductor films made of ITO can be formed separately on the fourth layers 10a and 10b.

The ion gun 37 is configured to introduce gas, which is to be ionized, into the second film formation chamber 32 and have an extraction electrode in the front thereof. The ion gun is a device that ionizes a part of atoms or molecules of gas, controls ionized particles in an electric field generated by the extraction electrode and emits the particles as an ion beam.

The light source device 36 has the configuration similar to that of the ion gun 37, i.e., is configured to irradiate the evaporation source 35a with electrons to sputter constituent particles of the evaporation source 35a. In the film formation device 30a, the important thing is being capable of sputtering constituent particles of the evaporation source 35a, and therefore, the film formation device 30a may be configured to sputter constituent particles of the evaporation source 35a upon application of voltage to the evaporation source 35a using, for example, a high frequency coil, and the light source device 36 may be omitted.

Next, described is the process for forming the conductor films made of ITO separately on the fourth layers 10a and 10b being the high refractive index layers at each plastic base 2 using the film formation device 30a as configured above. In order to form the conductor film made of ITO, the evaporation source 35a of ITO is used, and preparations are made to allow the top surface of the retention member 34 to be irradiated with ions emitted from the ion gun 37. Subsequently, the interior of the film formation chamber 32 housing the plastic bases 2 is evacuated to establish a reduced-pressure atmosphere. Then the ion gun 37 and the light source device 36 are activated. Note that when an optical multilayer film for spectacle lenses is formed by ion-beam assisted deposition using the film formation device 30a, it is preferable that, for example, the accelerating voltage be from 100 V to 1000 V and the accelerating current be from 10 to 500 mA, although they vary depending on the type of the ion source and therefore are difficult to generally define.

When the light source device 36 irradiates the evaporation source 35a with electrons, constituent particles of the evaporation source 35a are sputtered and go over the fourth layers 10a and 10b. As the constituent particles sputtered from the evaporation source 35a are deposited on the fourth layers 10a and 10b, the ion gun 37 emits argon ions.

In this embodiment, ion-beam assisted deposition is preferably carried out with at least one gas selected from an inert gas, an oxygen gas, and a mixed gas of inert and oxygen gases. The inert gas is preferably an argon gas.

After the optical multilayer films 3a and 3b are formed in the foregoing manner, the water and oil repellent films 12 are formed separately on these films to thereby form the spectacle lens 1.

Exemplary processes for forming the water and oil repellent films 12 include wet processes such as dipping, spin coating and spraying, and dry processes such as vacuum evaporation.

Among the wet processes, dipping is typically and widely used. This process involves immersing a spectacle lens in which layers up to the optical multilayer films 3a and 3b have been formed in a solution obtained by dissolving a fluorine-substituted, alkyl group-containing organosilicon compound in an organic solvent, pulling out the spectacle lens under certain conditions, followed by drying, thereby forming the relevant films. For the organic solvent, usable examples include perfluorohexane, perfluoro-4-methoxybutane, perfluoro-4-ethoxybutane and m-xylene hexafluoride.

The concentration after dilution using the organic solvent is preferably 0.01 to 0.5 wt % and more preferably 0.03 to 0.1 wt %. Too low concentration leads to the water and oil repellent film 12 having an insufficient thickness, while too high concentration leads to uneven coating as well as high material costs.

Among the dry processes, vacuum evaporation is often used. This process involves heating and evaporating a fluorine-substituted, alkyl group-containing organosilicon compound in a vacuum chamber, thereby forming the water and oil repellent films 12.

In the thus-formed spectacle lens 1 of this embodiment, since the optical multilayer films 3a and 3b are configured such that the sum of their average reflectances in the wavelength range of 530 to 570 nm is 3.0 to 6.0%, this allows middle-aged and elderly people wearing the relevant spectacles to see objects brightly and vividly even in a gloomy place and particularly to perceive red brightly as red is not impaired in its vividness, and also allows the middle-aged and elderly people to perceive white, for example, a white screen on a personal computer to be whiter and as a result to more comfortably perform operations in which their eyes are to be fixed on white, for example, operations on a personal computer, as described above.

When a light source is observed using the spectacle lens of this embodiment, the color temperatures of light sources such as artificial sunlight lamps, daylight LED bulbs and daylight fluorescent lamps increase by 1% to 3% compared to the case of not using the spectacle lens of this embodiment.

With the method of manufacturing a spectacle lens, it is possible to reliably provide an excellent spectacle lens suitable for the eyes of middle-aged and elderly people.

As described above, the spectacle lens 1 of this embodiment selectively cuts light in the medium wavelength range of 530 nm to 570 nm with the optical multilayer films 3a and 3b provided separately on the opposite sides, and at least one of the optical multilayer films on either side is preferably configured such that the luminous reflectance falls within the specified range, thereby slightly cutting light in a large part of the visible wavelength range.

Figure 12:
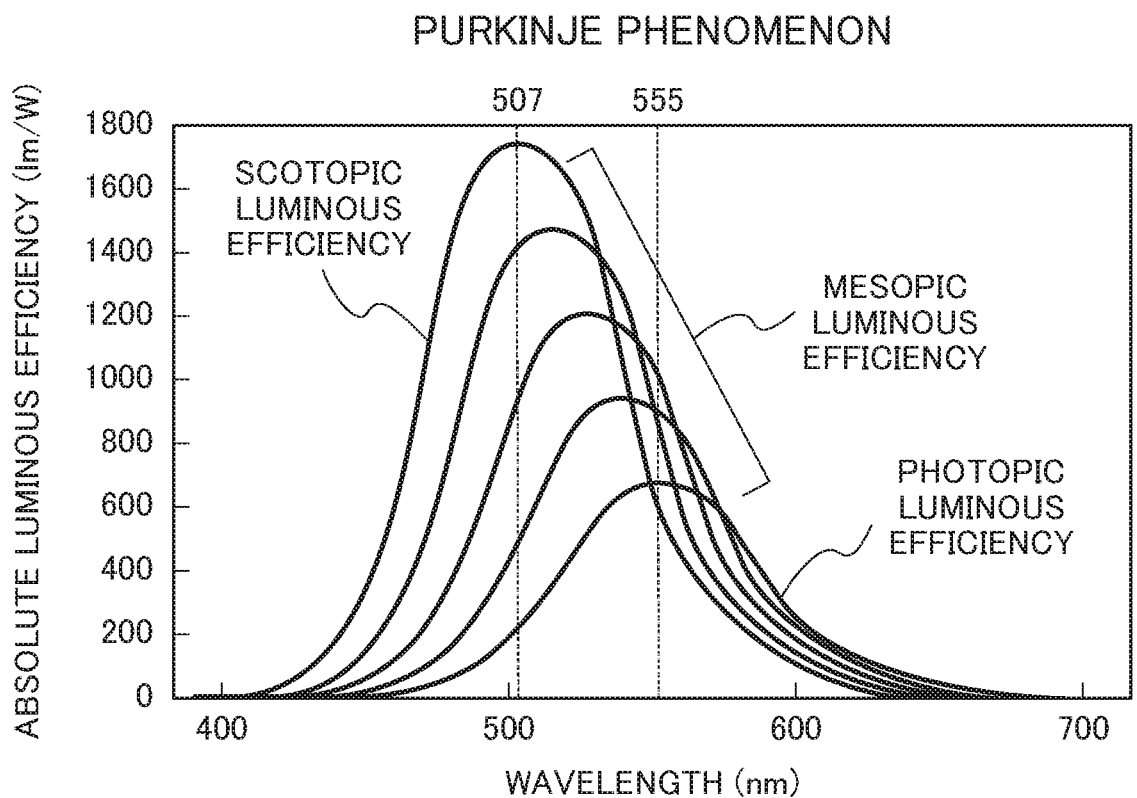
FIG. 12 is an explanatory diagram illustrating Purkinje phenomenon of human eyes as indicated by absolute luminous efficiency with respect to wavelength.

As described in the conventional technique using FIG. 12, the luminous efficiency (luminous efficacy) itself of human eyes is low in a bright place and the sensitivity peak is at around 555 nm. However, as it gets darker for lack of light, the luminous efficiency increases to be higher and the sensitivity peak shifts and deviates to the short wavelength side. Therefore, Purkinje phenomenon occurs in which even if human eyes perceive red and blue at the same brightness in a bright place, red is perceived to be dustier and darker in a gloomy place.

Therefore, the effect that objects can be seen brightly and vividly even in a gloomy place can be obtained by using the spectacle lens of this embodiment that selectively cuts light in the medium wavelength region of 530 nm to 570 nm as well as preferably slightly cuts light in a large part of the visible wavelength region in order to provide a bright view of a slightly-reddish color which is perceived to be darker due to lower sensitivity in a gloomy place.

EXAMPLES

The present invention is more specifically described based on examples. However, the invention should not be construed as being limited to the following examples.

Example 1

A pretreatment was performed in which a primer coating with a refractive index of 1.67 and a silicon hard coating with a refractive index of 1.67 were cured under heating on each of the opposite surfaces (the top surface (front surface; outer side) and the back surface (human face side)) of a urethane synthetic resin substrate being the plastic base 2 shown in FIG. 1, to thereby form a functional thin film 4 made up of a primer layer 5 and a hard coating layer 6. Thereafter, optical multilayer films 3a and 3b were formed separately on the formed films by vacuum evaporation as described below, thereby forming a spectacle lens 1 of Example 1.

Back surface: The urethane synthetic resin substrate (hereinafter called "plastic base 2") was set to a rotating dome provided in a vacuum chamber, the interior of the vacuum chamber was heated to a temperature of 70° C., air was discharged to a pressure of 1.0×10-3 Pa, Ar ion beam cleaning was performed for 60 seconds under conditions of an accelerating voltage of 500 V and an accelerating current of 100 mA. Thereafter, a first layer $SiO_2$ (refractive index: 1.47) with an optical thickness of 0.100λ, a second layer $ZrO_2$ (refractive index: 2.00) with an optical thickness of 0.150λ, a third layer $SiO_2$ (refractive index: 1.47) with an optical thickness of 0.080λ, a fourth layer $ZrO_2$ (refractive index: 2.00) with an optical thickness of 0.250λ and a fifth layer $SiO_2$ (refractive index: 1.47) with an optical thickness of 0.300λ were stacked sequentially on the back surface of the plastic base 2, thereby forming the optical multilayer film 3b.

Top surface (front surface; outer side): Using the same device and in the same processing atmosphere as those for the surface on the human face side, a first layer $SiO_2$ (refractive index: 1.47) with an optical thickness of 0.150λ, a second layer $ZrO_2$ (refractive index: 2.00) with an optical thickness of 0.080λ, a third layer $SiO_2$ (refractive index: 1.47) with an optical thickness of 0.040λ, a fourth layer $ZrO_2$ (refractive index: 2.00) with an optical thickness of 0.500λ and a fifth layer $SiO_2$ (refractive index: 1.47) with an optical thickness of 0.250λ were stacked sequentially on the front surface of the plastic base 2 having undergone the pretreatment, thereby forming the optical multilayer film 3a.

In Examples and Comparative Examples, for both of the optical multilayer films 3a and 3b on the opposite sides, the wavelength λ is the design central wavelength and was set to 500 nm.

Figure 5:
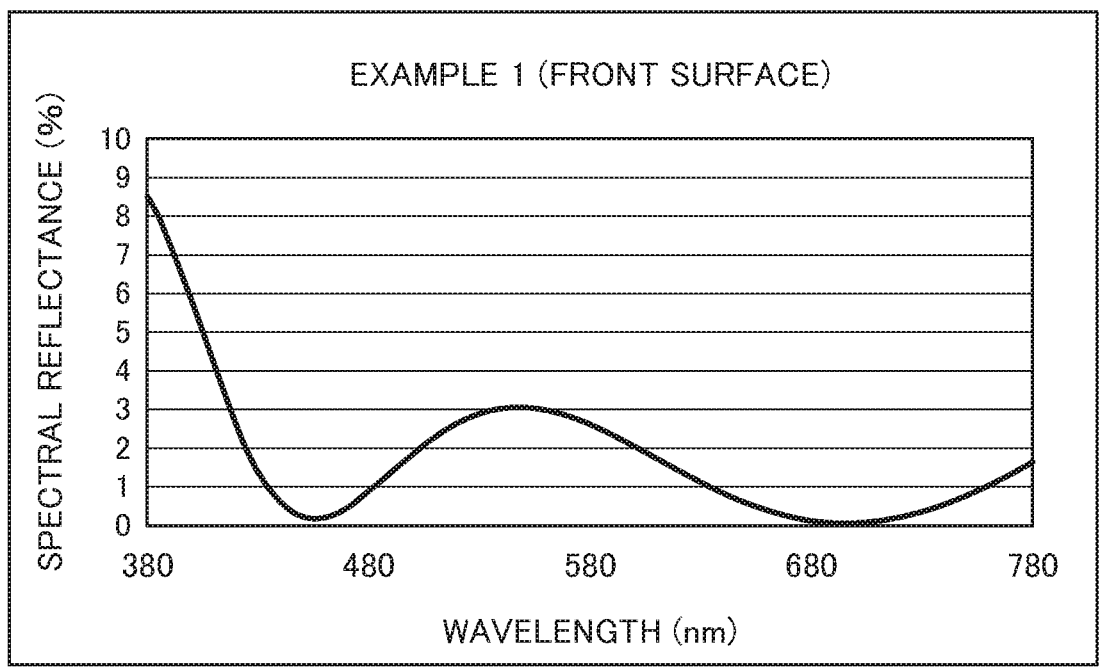
FIG. 5 is a graph showing reflection spectral characteristics of a multilayer film at the front surface of a spectacle lens of Example 1.
Figure 6:
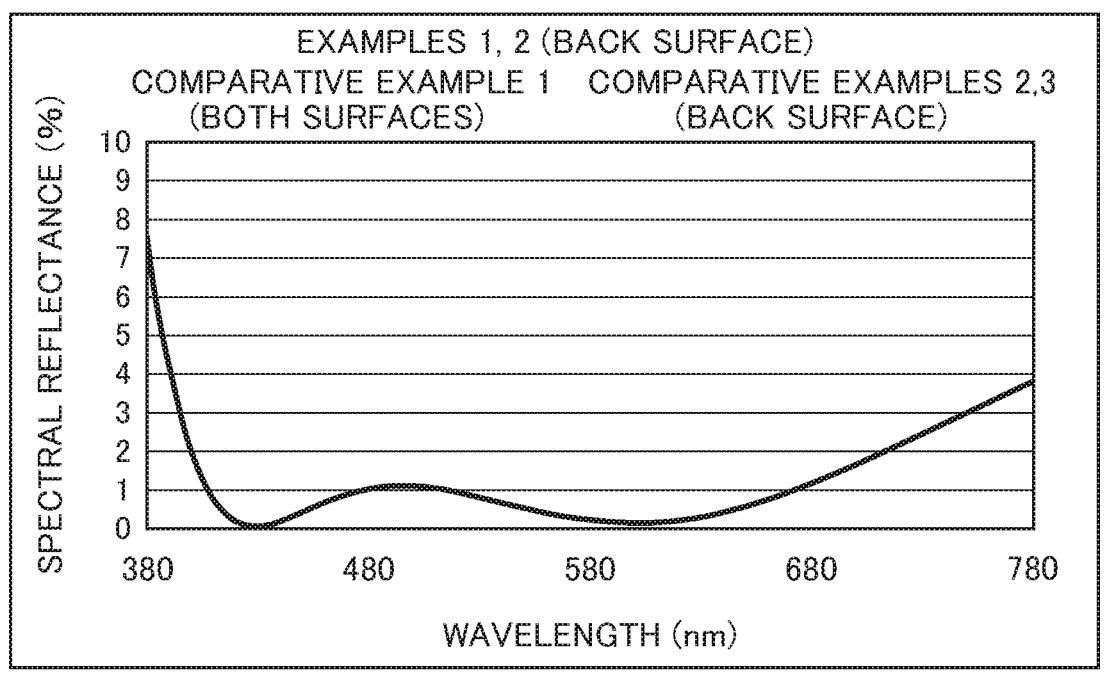
FIG. 6 is a graph showing reflection spectral characteristics of a multilayer film at the back surface of each of spectacle lenses of Examples 1 and 2 and Comparative Examples 2 and 3 or at either surface of a spectacle lens of Comparative Example 1.

The reflection spectral characteristics of the optical multilayer film 3a on the top (front) surface in the thus-manufactured spectacle lens 1 of Example 1 are shown in FIG. 5, while the reflection spectral characteristics of the optical multilayer film 3b on the back surface in Example 1 are shown in FIG. 6.

The average reflectances of the optical multilayer films 3a and 3b on the front and back surfaces in each of the wavelength ranges of 530 to 570 nm, 430 to 470 nm and 630 to 730 nm and the wavelength range of 530 to 580 nm, as well as the sum of the average reflectances on the front and back surfaces, were obtained. The average reflectance here is the average of reflectances measured at wavelength intervals of 1 nm. In addition, the luminous reflectances of the optical multilayer films 3a and 3b on the front and back surfaces as well as the sum of the luminous reflectances on the front and back surfaces were obtained.

Table 1 shows the configurations of the multilayer films in Example 1 and values obtained as the film characteristics, i.e., the average reflectances on the back surface and the top (front) surface, as well as the sum thereof, in each of the four wavelength ranges of 530 to 570 nm, 530 to 580 nm, 430 to 470 nm and 630 to 730 nm and the luminous reflectances on the back surface and the top (front) surface as well as the sum thereof.

As can be seen from FIG. 5, the optical multilayer film 3a on the front surface in Example 1 has a spectral reflectance as high as the medium level in the wavelength range of 530 to 570 nm. It should be understood that when used in combination with the optical multilayer film 3b on the back surface in Example 1 which has the reflection spectral characteristics shown in FIG. 6 and is a typical antireflection film used in a spectacle lens, the optical multilayer film 3a can properly cut green light at 530 to 570 nm (530 to 580 nm) without excessively cutting light outside of the wavelength ranges of 530 to 570 nm and 530 to 580 nm.

Further, as can be seen from FIG. 5, the optical multilayer film 3a in Example 1 has one local maximum spectral reflectance in the wavelength range of 530 to 570 nm (530 to 580 nm), and the local maximum reflectance is 3.0%, which falls within the range of 2.0 to 6.0%.

It should be understood that even when the wavelength range of 530 to 570 nm is widened to the wavelength range of 530 to 580 nm, the optical multilayer film 3a on the front surface in Example 1 exhibits similar reflection spectral characteristics, as described above.

Example 2

As with Example 1, after the pretreatment was performed on the opposite surfaces of the plastic base 2, optical multilayer films 3a and 3b were formed by vacuum evaporation as described below, thereby forming a spectacle lens 1 of Example 2.

Front surface: Using the same device and in the same processing atmosphere as in Example 1, a first layer $SiO_2$ (refractive index: 1.47) with an optical thickness of 0.250λ, a second layer $ZrO_2$ (refractive index: 2.00) with an optical thickness of 0.040λ, a third layer $SiO_2$ (refractive index: 1.47) with an optical thickness of 0.060λ, a fourth layer $ZrO_2$ (refractive index: 2.00) with an optical thickness of 0.550λ and a fifth layer $SiO_2$ (refractive index: 1.47) with an optical thickness of 0.250λ were, through vacuum evaporation, stacked sequentially on the front surface of the plastic base 2 having undergone the pretreatment, thereby forming the optical multilayer film 3a.

Back surface: Using the same device and in the same processing atmosphere as in Example 1, the optical multilayer film 3b on the back surface in Example 2 having the totally same multilayer film configuration as the optical multilayer film 3b on the back surface in Example 1 was formed by vacuum evaporation on the back surface of the plastic base 2 having undergone the pretreatment.

Figure 7:
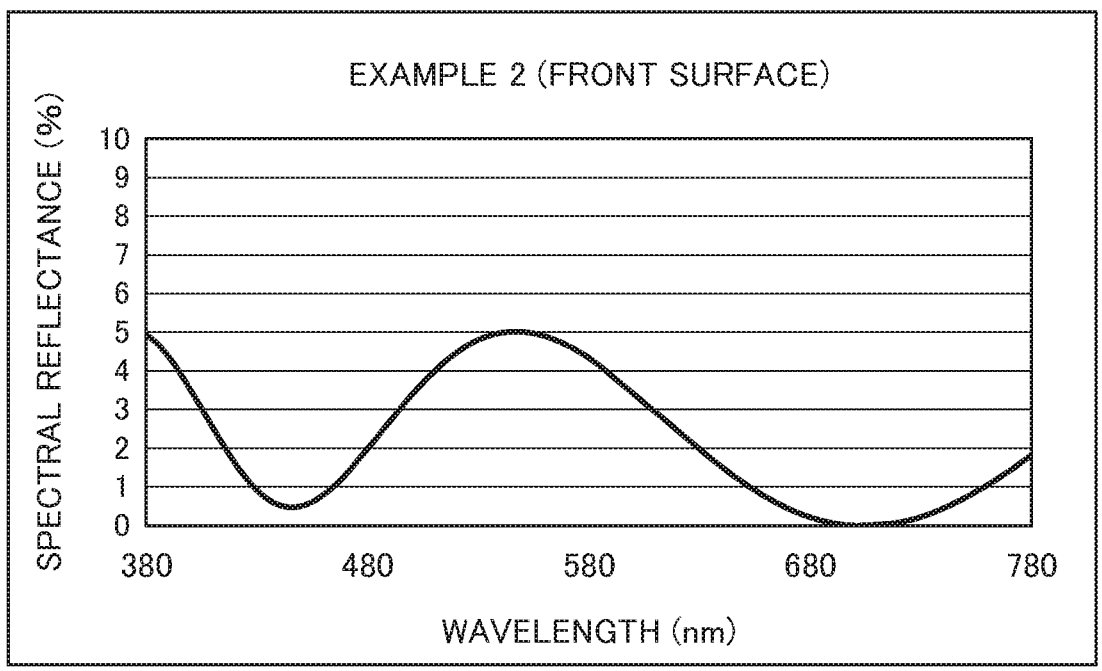
FIG. 7 is a graph showing reflection spectral characteristics of a multilayer film at the front surface of a spectacle lens of Example 2.

The reflection spectral characteristics of the optical multilayer film 3a on the front surface in the thus-manufactured spectacle lens 1 of Example 2 are shown in FIG. 7. The reflection spectral characteristics of the optical multilayer film 3b on the back surface in Example 2 were the same as those of the optical multilayer film 3b on the back surface in Example 1 shown in FIG. 6.

As with Example 1, the average reflectances on the front (top) surface and the back surface, as well as the sum thereof, in each of the foregoing four wavelength ranges and the luminous reflectances on the back surface and the top (front) surface as well as the sum thereof were obtained as the film characteristics.

The configurations and the film characteristics of the multilayer films in Example 2 are shown in Table 1.

As can be seen from FIG. 7, the optical multilayer film 3a on the front surface in Example 2 has a spectral reflectance as high as the medium level in the wavelength range of 530 to 570 nm. It should be understood that when used in combination with the optical multilayer film 3b on the back surface in Example 2 which has the reflection spectral characteristics shown in FIG. 6 and is a typical antireflection film used in a spectacle lens, the optical multilayer film 3*a* can properly cut green light at 530 to 570 nm without excessively cutting light outside of the wavelength range of 530 to 570 nm.

Further, as can be seen from FIG. 7, the optical multilayer film 3*a* in Example 2 has one local maximum spectral reflectance in the wavelength range of 530 to 570 nm, and the local maximum reflectance is 5.0%, which falls within the range of 2.0 to 6.0%.

It should be understood that even when the wavelength range of 530 to 570 nm is widened to the wavelength range of 530 to 580 nm, the optical multilayer film 3*a* on the front surface in Example 2 exhibits similar reflection spectral characteristics, as with Example 1.

Comparative Example 1

Front surface: Using the same device and in the same processing atmosphere as in Example 1, an optical multilayer film on the front surface in Comparative Example 1 having the totally same multilayer film configuration as the optical multilayer film 3*b* on the back surface in Example 1 was formed by vacuum evaporation on the front surface of the plastic base 2 having undergone the pretreatment.

Back surface: Using the same device and in the same processing atmosphere as in Example 1, an optical multilayer film on the back surface in Comparative Example 1 having the totally same multilayer film configuration as the optical multilayer film 3*b* on the back surface in Example 1 was formed by vacuum evaporation on the back surface of the plastic base 2 having undergone the pretreatment.

A spectacle lens of Comparative Example 1 was thus manufactured.

The thus-manufactured optical multilayer films on the front and back surfaces in Comparative Example 1 each have reflection spectral characteristics shown in FIG. 6 that are seen in typical antireflection films used in spectacle lenses, as with the optical multilayer films 3*b* on the back surfaces in Examples 1 and 2.

As with Example 1, the average reflectances in each of the four wavelength ranges and the luminous reflectances of the optical multilayer films on the front and back surfaces in Comparative Example 1 were obtained.

The configurations and the film characteristics of the multilayer films in Comparative Example 1 are shown in Table 2.

As can be seen from FIG. 6, each of the optical multilayer films on the front and back surfaces in Comparative Example 1 is a typical antireflection film used in a spectacle lens and has a spectral reflectance that is not high in the wavelength range of 530 to 570 nm (530 to 580 nm), thus exhibiting the reflection spectral characteristics completely different from the reflection spectral characteristics in Example 1 shown in FIG. 5.

Comparative Example 2

Front surface: Using the same device and in the same processing atmosphere as in Example 1, a first layer $ZrO_2$ (refractive index: 2.00) with an optical thickness of 0.100λ, a second layer $SiO_2$ (refractive index: 1.47) with an optical thickness of 0.080λ, a third layer $ZrO_2$ (refractive index: 2.00) with an optical thickness of 0.060λ, a fourth layer $SiO_2$ (refractive index: 1.47) with an optical thickness of 0.400λ, a fifth layer $ZrO_2$ (refractive index: 2.00) with an optical thickness of 0.150λ, a sixth layer $SiO_2$ (refractive index: 1.47) with an optical thickness of 0.100λ, a seventh layer $ZrO_2$ (refractive index: 2.00) with an optical thickness of 0.180λ, and an eighth layer $SiO_2$ (refractive index: 1.47) with an optical thickness of 0.280λ were, through vacuum evaporation, stacked sequentially on the front surface of the plastic base 2 having undergone the pretreatment, thereby forming an optical multilayer film on the front surface in Comparative Example 2.

Back surface: Using the same device and in the same processing atmosphere as in Example 1, an optical multilayer film of the back surface in Comparative Example 1 having the totally same multilayer film configuration as the optical multilayer film 3*b* on the back surface in Example 2 was formed by vacuum evaporation on the back surface of the plastic base 2 having undergone the pretreatment.

A spectacle lens of Comparative Example 2 was thus manufactured.

Figure 8:
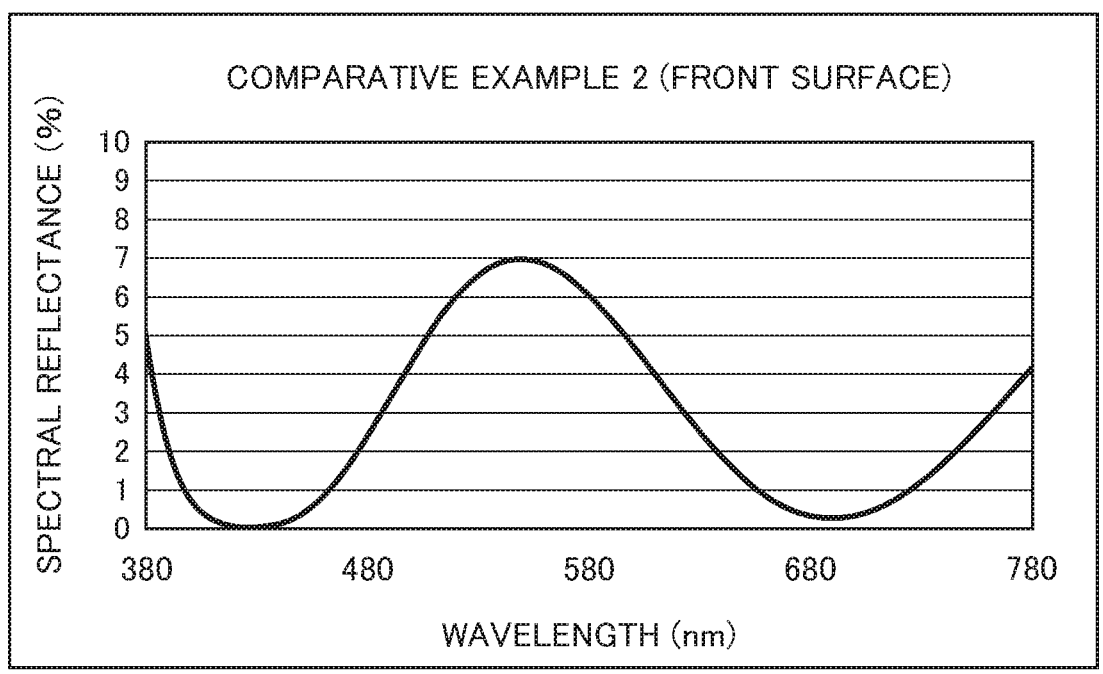
FIG. 8 is a graph showing reflection spectral characteristics of a multilayer film at the front surface of a spectacle lens of Comparative Example 2.

The reflection spectral characteristics of the optical multilayer film on the front surface in the thus-manufactured spectacle lens 1 of Comparative Example 2 are shown in FIG. 8. The reflection spectral characteristics of the optical multilayer film on the back surface in Comparative Example 2 were the same as those of the optical multilayer film 3*b* on the back surface in Example 1 shown in FIG. 6.

As with Example 1, the average reflectances in each of the four wavelength ranges and the luminous reflectances of the optical multilayer films on the front and back surfaces in Comparative Example 2 were obtained.

The configurations and the film characteristics of the multilayer films in Comparative Example 2 are shown in Table 2.

As can be seen from FIG. 8, the optical multilayer film on the front surface in Comparative Example 2 has a spectral reflectance that is too high in the wavelength range of 530 to 570 nm (530 to 580 nm), thus exhibiting the reflection spectral characteristics completely different from the reflection spectral characteristics in Example 1 shown in FIG. 5. The optical multilayer film on the front surface in Comparative Example 2 has the reflection spectral characteristics shown in FIG. 6, and it should be understood that even when used in combination with the optical multilayer film on the back surface in Comparative Example 2 which is a typical antireflection film, the optical multilayer film on the front surface excessively cuts green light at 530 to 570 nm (530 to 580 nm).

Comparative Example 3

Front surface: Using the same device and in the same processing atmosphere as in Example 1, a first layer $ZrO_2$ (refractive index: 2.00) with an optical thickness of 0.100λ, a second layer $SiO_2$ (refractive index: 1.47) with an optical thickness of 0.060λ, a third layer $ZrO_2$ (refractive index: 2.00) with an optical thickness of 0.060λ, a fourth layer $SiO_2$ (refractive index: 1.47) with an optical thickness of 0.420λ, a fifth layer $ZrO_2$ (refractive index: 2.00) with an optical thickness of 0.150λ, a sixth layer $SiO_2$ (refractive index: 1.47) with an optical thickness of 0.100λ, a seventh layer $ZrO_2$ (refractive index: 2.00) with an optical thickness of 0.180λ, and an eighth layer $SiO_2$ (refractive index: 1.47) with an optical thickness of 0.270λ were, through vacuum evaporation, stacked sequentially on the front surface of the plastic base 2 having undergone the pretreatment, thereby forming an optical multilayer film on the front surface in Comparative Example 3.

Back surface: Using the same device and in the same processing atmosphere as in Example 1, an optical multilayer film on the back surface in Comparative Example 1 having the totally same multilayer film configuration as the optical multilayer film 3*b* on the back surface in Example 2 was formed by vacuum evaporation on the back surface of the plastic base 2 having undergone the pretreatment.

A spectacle lens of Comparative Example 3 was thus manufactured.

Figure 9:
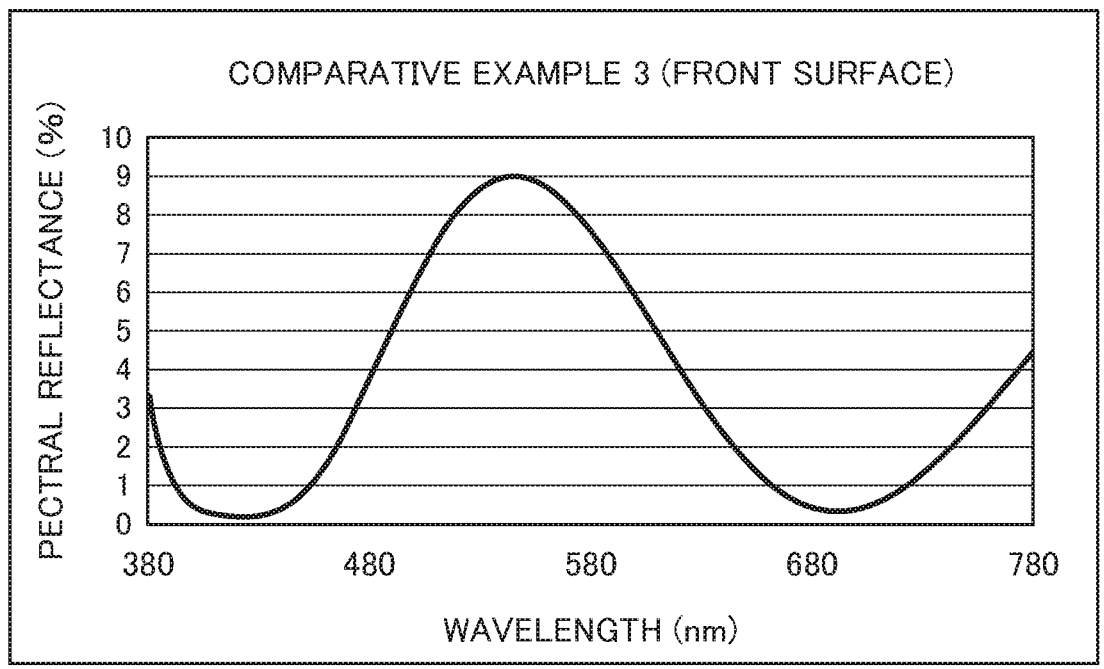
FIG. 9 is a graph showing reflection spectral characteristics of a multilayer film at the front surface of a spectacle lens of Comparative Example 3.
Figure 10:
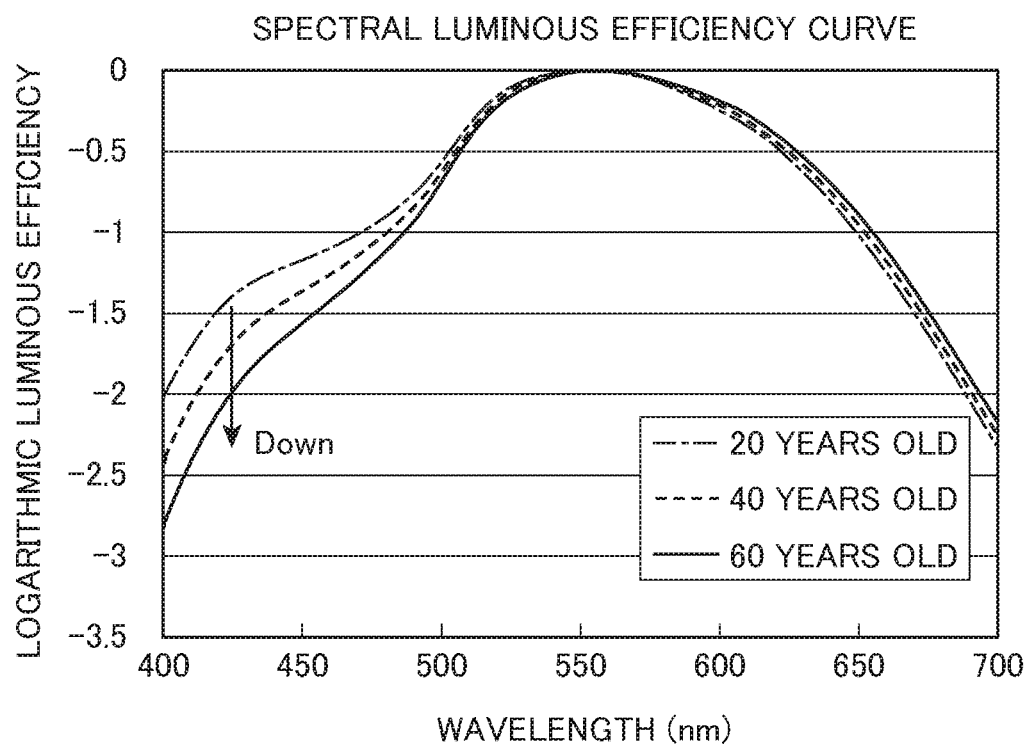
FIG. 10 is a graph showing spectral luminous efficiency curves of human eyes as indicated by logarithmic luminous efficiency with respect to wavelength.
Figure 11:
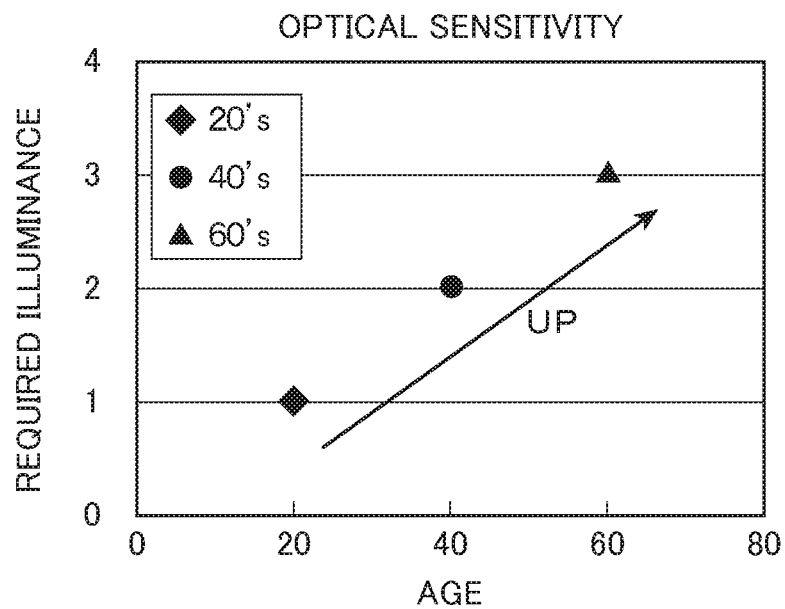
FIG. 11 is an explanatory diagram showing optical luminous efficiency of human eyes as indicated by required illuminance with respect to human age.

The reflection spectral characteristics of the optical multilayer film on the front surface in the thus-manufactured spectacle lens 1 of Comparative Example 3 are shown in FIG. 9. The reflection spectral characteristics of the optical multilayer film on the back surface in Comparative Example 3 were the same as those of the optical multilayer film 3*b* on the back surface in Example 1 shown in FIG. 6.

As with Example 1, the average reflectances in each of the four wavelength ranges and the luminous reflectances of the optical multilayer films on the front and back surfaces in Comparative Example 3 were obtained.

The configurations and the film characteristics of the multilayer films in Comparative Example 3 are shown in Table 2.

As can be seen from FIG. 9, the optical multilayer film on the front surface in Comparative Example 3 has a spectral reflectance that is too high in the wavelength range of 530 to 570 nm (530 to 580 nm), thus exhibiting the reflection spectral characteristics completely different from the reflection spectral characteristics in Example 1 shown in FIG. 5. The optical multilayer film on the front surface in Comparative Example 3 has the reflection spectral characteristics shown in FIG. 6, and it should be understood that even when used in combination with the optical multilayer film on the back surface in Comparative Example 2 which is a typical antireflection film, the optical multilayer film on the front surface excessively cuts green light at 530 to 570 nm (530 to 580 nm).

TABLE 1

| Example 1 | | | | |
|---|---|---|---|---|
| | Back surface | | Top surface | |
| | Substance | Optical thickness | Substance | Optical thickness |
| First layer | SiO2 | 0.100 | SiO2 | 0.150 |
| Second layer | ZrO2 | 0.150 | ZrO2 | 0.080 |
| Third layer | SiO2 | 0.080 | SiO2 | 0.040 |
| Fourth layer | ZrO2 | 0.250 | ZrO2 | 0.500 |
| Fifth layer | SiO2 | 0.300 | SiO2 | 0.250 |

| Example 1 | | Back surface | Top surface | Sum of values of top and back surfaces |
|---|---|---|---|---|
| Luminous reflectance | | 0.6% | 2.4% | 3.0% |
| Average reflectance | 530-570 nm | 0.6% | 3.0% | 3.6% |
| | 530-580 nm | 0.5% | 2.9% | 3.4% |
| | 430-470 nm | 0.5% | 0.5% | 1.0% |
| | 630-670 nm | 0.6% | 0.6% | 1.2% |

| Example 2 | | | | |
|---|---|---|---|---|
| | Back surface | | Top surface | |
| | Substance | Optical thickness | Substance | Optical thickness |
| First layer | SiO2 | 0.100 | SiO2 | 0.250 |
| Second layer | ZrO2 | 0.150 | ZrO2 | 0.040 |
| Third layer | SiO2 | 0.080 | SiO2 | 0.060 |

TABLE 1-continued

| Fourth layer | ZrO2 | 0.250 | ZrO2 | 0.550 |
| Fifth layer | SiO2 | 0.300 | SiO2 | 0.250 |

| Example 2 | | Back surface | Top surface | Sum of values of top and back surfaces |
|---|---|---|---|---|
| Luminous reflectance | | 0.6% | 4.6% | 5.2% |
| Average reflectance | 530-570 nm | 0.6% | 4.9% | 5.5% |
| | 530-580 nm | 0.5% | 4.8% | 5.3% |
| | 430-470 nm | 0.5% | 0.7% | 1.2% |
| | 630-670 nm | 0.6% | 1.1% | 1.7% |

TABLE 2

| Comparative Example 1 | | | | |
|---|---|---|---|---|
| | Back surface | | Top surface | |
| | Substance | Optical thickness | Substance | Optical thickness |
| First layer | SiO2 | 0.100 | ZrO2 | 0.100 |
| Second layer | ZrO2 | 0.150 | SiO2 | 0.150 |
| Third layer | SiO2 | 0.080 | ZrO2 | 0.080 |
| Fourth layer | ZrO2 | 0.250 | SiO2 | 0.250 |
| Fifth layer | SiO2 | 0.300 | ZrO2 | 0.300 |

| Comparative Example 1 | | Back surface | Top surface | Sum of values of top and back surfaces |
|---|---|---|---|---|
| Luminous reflectance | | 0.6% | 0.6% | 1.2% |
| Average reflectance | 530-570 nm | 0.6% | 0.6% | 1.2% |
| | 530-580 nm | 0.5% | 0.5% | 1.0% |
| | 430-470 nm | 0.5% | 0.5% | 1.0% |
| | 630-670 nm | 0.6% | 0.6% | 1.2% |

| Comparative Example 2 | | | | |
|---|---|---|---|---|
| | Back surface | | Top surface | |
| | Substance | Optical thickness | Substance | Optical thickness |
| First layer | SiO2 | 0.100 | ZrO2 | 0.100 |
| Second layer | ZrO2 | 0.150 | SiO2 | 0.080 |
| Third layer | SiO2 | 0.080 | ZrO2 | 0.060 |
| Fourth layer | ZrO2 | 0.250 | SiO2 | 0.400 |
| Fifth layer | SiO2 | 0.300 | ZrO2 | 0.150 |
| Sixth layer | | | SiO2 | 0.100 |
| Seventh layer | | | ZrO2 | 0.180 |
| Eighth layer | | | SiO2 | 0.280 |

| Comparative Example 2 | | Back surface | Top surface | Sum of values of top and back surfaces |
|---|---|---|---|---|
| Luminous reflectance | | 0.6% | 5.5% | 6.1% |
| Average reflectance | 530-570 nm | 0.6% | 6.8% | 7.4% |
| | 530-580 nm | 0.5% | 6.7% | 7.2% |
| | 430-470 nm | 0.5% | 0.5% | 1.0% |
| | 630-670 nm | 0.6% | 1.4% | 2.2% |

| Comparative Example 3 | | | | |
|---|---|---|---|---|
| | Back surface | | Top surface | |
| | Substance | Optical thickness | Substance | Optical thickness |
| First layer | SiO2 | 0.100 | ZrO2 | 0.100 |
| Second layer | ZrO2 | 0.150 | SiO2 | 0.060 |

TABLE 2-continued

| Third layer | SiO2 | 0.080 | ZrO2 | 0.060 |
| Fourth layer | ZrO2 | 0.250 | SiO2 | 0.420 |
| Fifth layer | SiO2 | 0.300 | ZrO2 | 0.150 |
| Sixth layer | | | SiO2 | 0.100 |
| Seventh layer | | | ZrO2 | 0.180 |
| Eighth layer | | | SiO2 | 0.270 |

| Comparative Example 3 | | Back surface | Top surface | Sum of values of top and back surfaces |
|---|---|---|---|---|
| Luminous reflectance | | 0.6% | 7.2% | 7.8% |
| Average reflectance | 530-570 nm | 0.6% | 8.8% | 9.4% |
| | 530-580 nm | 0.5% | 8.6% | 9.1% |
| | 430-470 nm | 0.5% | 1.0% | 1.5% |
| | 630-670 nm | 0.6% | 1.7% | 2.3% |

Comparing values in Examples 1 and 2 with values in Comparative Examples 1 to 3 as obtained above, the following results were obtained.

As is clear from Table 1, it is revealed that the average reflectances of the optical multilayer film 3a on the front surface in Example 1 in the wavelength ranges of 530 to 570 nm and 530 to 580 nm are respectively 3.0% and 2.9%, both of which fall within the range of 2.5 to 5.5%. Further, as is clear from Table 1, it is revealed that the sums of the average reflectances of the optical multilayer films 3a and 3b in Example 1 in the wavelength ranges of 530 to 570 nm and 530 to 580 nm are respectively 3.6% and 3.4%, both of which fall within the range of 3.0 to 6.0%. It is also revealed that the luminous reflectances of the optical multilayer films 3a and 3b on the front and back surfaces in Example 1 are respectively 2.4% and 0.6% and the luminous reflectance of the optical multilayer film 3a on the front surface falls within the range of 1.5% to 5.0%. It is also revealed that the average reflectance of the optical multilayer film 3a on the front surface in Example 1 in the wavelength range of 430 to 470 nm is 0.5% and the average reflectance thereof in the wavelength range of 630 to 670 nm is 0.6%, and thus both average reflectances are not more than 2.0%. It is also revealed that the sum of the average reflectances of the optical multilayer films 3a and 3b on the front and back surfaces in Example 1 in the wavelength range of 430 to 470 nm is 1.0% and the sum of the average reflectances thereof in the wavelength range of 630 to 670 nm is 1.2%, and thus both sums are in the range of not more than 2.0%.

As is clear from Table 1, it is revealed that the average reflectances of the optical multilayer film 3a on the front surface in Example 2 in the wavelength ranges of 530 to 570 nm and 530 to 580 nm are respectively 4.9% and 4.8%, both of which fall within the range of 2.5 to 5.5%. Further, as is clear from Table 1, it is revealed that the sums of the average reflectances of the optical multilayer films 3a and 3b in Example 2 in the wavelength ranges of 530 to 570 nm and 530 to 580 nm are respectively 5.5% and 5.3%, both of which fall within the range of 3.0 to 6.0%. It is also revealed that the luminous reflectances of the optical multilayer films 3a and 3b on the front and back surfaces in Example 2 are respectively 4.6% and 0.6% and the luminous reflectance of the optical multilayer film 3a on the front surface falls within the range of 1.5% to 5.0%. It is also revealed that the average reflectance of the optical multilayer film 3a on the front surface in Example 2 in the wavelength range of 430 to 470 nm is 0.7% and the average reflectance thereof in the wavelength range of 630 to 670 nm is 1.1%, and thus both average reflectances are not more than 2.0%. It is also revealed that the sum of the average reflectances of the optical multilayer films 3a and 3b on the front and back surfaces in Example 2 in the wavelength range of 430 to 470 nm is 1.2% and the sum of the average reflectances thereof in the wavelength range of 630 to 670 nm is 1.7%, and thus both sums are in the range of not more than 2.0%.

Next, it is revealed that the sums of the average reflectances of the optical multilayer films on the front and back surfaces in Comparative Examples 1 to 3 in the wavelength range of 530 to 570 nm are respectively 1.2%, 7.4% and 9.4%, while the sums thereof in the wavelength range of 530 to 580 nm are respectively 1.0%, 7.2% and 9.1%, and thus all the sums are outside of the range of 3.0 to 6.0%.

Next, the spectacle lenses of Examples 1 to 2 and Comparative Examples 1 to 3 were put into frames, and a wearing test was conducted with the aid of subjects to perform a sensory evaluation. In the sensory evaluation, ordinary people in their 30 s to 60 s were selected as the subjects and made to use the spectacle lenses of Examples 1 to 2 and Comparative Examples 1 to 3, and a questionnaire survey was carried out which inquires as to whether or not a screen on a personal computer (particularly during operation on an Excel file) was perceived to be whiter compared to when no spectacle lens was used.

When a subject felt the effect that, comparing to when using no spectacle lens, a landscape and an object were seen vividly and brightly, particularly in red color, in a gloomy environment, and a white screen on a personal computer was perceived to be whiter, it was rated as good. When a subject did not feel the effect or felt that reflection at the lens surface was annoying or that the sight was dark comparing to when using no spectacle lens, it was rated as poor.

In addition, the color temperatures of the light sources of an artificial sunlight (illumination) lamp, a daylight LED (bulb) and a daylight fluorescent lamp were measured with a spectroradiometer for the cases where light went through the respective lenses of Examples 1 and 2 and Comparative Examples 1 to 3 and the case where light did not go through any lens.

The sensory evaluation results obtained through the questionnaire survey and the measurement results of color temperatures of the light sources are shown in Table 3.

TABLE 3

| | | Color temperature (K) | | |
|---|---|---|---|---|
| | Sensory evaluation | Artificial sunlight lamp | Daylight LED | Daylight fluorescent lamp |
| No lens | — | 5732 | 5900 | 6956 |
| Example 1 | Good | 5817 | 6009 | 7072 |
| Example 2 | Good | 5860 | 6064 | 7131 |
| Comparative Example 1 | Poor | 5600 | 5913 | 6940 |
| Comparative Example 2 | Poor | 5902 | 6118 | 7189 |
| Comparative Example 3 | Poor | 5945 | 6173 | 7248 |

In each of Examples 1 and 2, the sum of the average reflectances of the optical multilayer films on the opposite sides in each of the foregoing three wavelength ranges falls within the specified range of the invention, and the effect of improving the vividness and brightness of objects, and particularly red, perceived in a gloomy environment as well as the effect of improving perception of white on a white screen of a personal computer were seen, and ratings of good were given.

The color temperatures of the light sources were measured to be higher when light went through each of the spectacle lenses of Examples 1 and 2 than when light did not go through any lens.

In contrast, in Comparative Example 1, the sum of the average reflectances at 530 to 570 nm (530 to 580 nm) is lower than the specified range of 3.0 to 6.0%, the effect did not obtained, and a rating of poor was given. The color temperatures measured with and without the spectacle lens were substantially the same.

In each of Comparative Examples 2 and 3, while the color temperatures were measured to be higher, the sum of the average reflectances at 530 to 570 nm (530 to 580 nm) is higher than the specified range of 3.0 to 6.0%, the effect did not obtained, and a rating of poor was given. This rating was given because when using the spectacle lens, subjects felt that reflection at the spectacle lens was annoying in sight due to too high reflectance.

It is clear from the foregoing results that the fact that the color temperature of a light source increases 1 to 3% more when the light source is observed through the lens of this embodiment than when it is observed without the lens, is favorable.

It is evident from the above that this embodiment can provide a spectacle lens that allows middle-aged and elderly people wearing the relevant spectacles to see objects brightly and vividly even in a gloomy place and particularly to perceive red brightly as red is not impaired in its vividness, and also allows the middle-aged and elderly people to perceive white, for example, a white screen on a personal computer to be whiter and as a result to more comfortably perform operations in which their eyes are to be fixed on white, for example, operations on a personal computer.

REFERENCE SIGNS LIST

1 spectacle lens; 2 plastic base; 3a, 3b optical multilayer film; 4 functional thin film; 5 primer layer (functional thin film); 6 hard coating layer (functional thin film); 7a, 7b first layer (low refractive index layer); 8a, 8b second layer (high refractive index layer); 9a, 9b third layer (low refractive index layer); 10a, 10b fourth layer (high refractive index layer); 11a, 11b fifth layer (low refractive index layer); 12 water and oil repellent film; 30 vacuum evaporation device (evaporation device); 30a film formation device; 31 first film formation chamber; 32 second film formation chamber; 33 third film formation chamber; 34 retention member; 35, 35a evaporation source; 35A first evaporation source; 35B second evaporation source; 36 light source; 37 ion gun.

The invention claimed is:

1. A spectacle lens comprising:
   multilayer films provided separately on opposite surfaces of a plastic lens base,
   wherein each of the multilayer films is composed of a high refractive index material that contains zirconium dioxide and a low refractive index material that contains silicon dioxide,
   wherein each of the multilayer films is a multilayer film having more than four layers and less than nine layers,
   wherein an average reflectance of one of the multilayer films provided on at least one of the opposite surfaces of the plastic lens base in at least a wavelength range of 530 to 570 nm is 2.5 to 5.5%,
   wherein one of the multilayer films provided on at least one of the opposite surfaces of the plastic lens base has one local maximum reflectance in at least the wavelength range of 530 to 570 nm, and the one local maximum reflectance is 2.0 to 6.0%,
   wherein the average reflectance and the one local maximum reflectance are obtained according to ISO standard ISO 8980-4 (2006) which uses a dual-beam or single-beam spectrophotometer with an incident angle not larger than 17°, and
   wherein a sum of average reflectances of the multilayer films provided separately on the opposite surfaces of the plastic lens base in at least the wavelength range of 530 to 570 nm is 3.0 to 6.0%.

2. The spectacle lens according to claim 1, wherein a luminous reflectance of one of the multilayer films provided on one of the opposite surfaces of the plastic lens base is 1.5 to 5.0%.

3. The spectacle lens according to claim 1, wherein at least the wavelength range of 530 to 570 nm comprises a wavelength range of 530 to 580 nm.

4. The spectacle lens according to claim 1 wherein a sum of average reflectances of the multilayer films provided separately on the opposite surfaces of the plastic lens base in a wavelength range of 430 to 470 nm is 2.0% or less.

5. The spectacle lens according to claim 1, wherein a sum of average reflectances of the multilayer films provided separately on the opposite surfaces of the plastic lens base in a wavelength range of 630 to 670 nm is 2.0% or less.

6. The spectacle lens according to claim 1,
   wherein a conductor film with a thickness of up to 20 nm or a metal film with a thickness of up to 20 nm is provided between the high refractive index material and the low refractive index material that are constituents of each of the multilayer films.

7. The spectacle lens according to claim 1, wherein a functional thin film is provided between the plastic lens base and each of the multilayer films.

8. A spectacle lens having multilayer films provided separately on opposite surfaces of a plastic lens base,
   wherein each of the multilayer films is composed of a high refractive index material that contains zirconium dioxide and a low refractive index material that contains silicon dioxide,
   wherein each of the multilayer films is a multilayer film having more than four layers and less than nine layers,
   wherein an average reflectance of one of the multilayer films provided on at least one of the opposite surfaces of the plastic lens base in at least a wavelength range of 530 to 570 nm is 2.5 to 5.5%,
   wherein one of the multilayer films provided on at least one of the opposite surfaces of the plastic lens base has one local maximum reflectance in at least the wavelength range of 530 to 570 nm, and the one local maximum reflectance is 2.0 to 6.0%,
   wherein a sum of average reflectances of the multilayer films provided separately on the opposite surfaces of the plastic lens base in a wavelength range of 430 to 470 nm is 2.0% or less,
   wherein a sum of average reflectances of the multilayer films provided separately on the opposite surfaces of the plastic lens base in at least the wavelength range of 530 to 570 nm is 3.0 to 6.0%,
   wherein a sum of average reflectances of the multilayer films provided separately on the opposite surfaces of the plastic lens base in a wavelength range of 630 to 670 nm is 2.0% or less, and
   wherein the average reflectances and the one local maximum reflectance are obtained according to ISO standard ISO 8980-4 (2006) which uses a dual-beam or single-beam spectrophotometer with an incident angle not larger than 17°.

9. A spectacle lens having multilayer films provided separately on opposite surfaces of a plastic lens base,
wherein each of the multilayer films is composed of a high refractive index material that contains zirconium dioxide and a low refractive index material that contains silicon dioxide,
wherein each of the multilayer films is a multilayer film having more than four layers and less than nine layers,
wherein an average reflectance of one of the multilayer films provided on at least one of the opposite surfaces of the plastic lens base in at least a wavelength range of 530 to 570 nm is 2.5 to 5.5%,
wherein a sum of average reflectances of the multilayer films provided separately on the opposite surfaces of the plastic lens base in at least the wavelength range of 530 to 570 nm is 3.0 to 6.0%,
wherein one of the multilayer films provided on at least one of the opposite surfaces of the plastic lens base has one relative maximum reflectance in at least the wavelength range of 530 to 570 nm, and the one relative maximum reflectance is 2.0 to 6.0%, and
wherein the average reflectance and the one relative maximum reflectance are obtained according to ISO standard ISO 8980-4 (2006) which uses a dual-beam or single-beam spectrophotometer with an incident angle not larger than 17°.

10. The spectacle lens according to claim 9, wherein the spectacle lens is configured for people wearing the spectacle lens to see objects brightly and vividly even in a gloomy environment by perceiving red more brightly than without the spectacle lens and perceiving white to be whiter than without the spectacle lens.

11. The spectacle lens according to claim 1, wherein a back surface of the plastic lens base includes:
a primer layer having an optical thickness from approximately 0.5 μm to approximately 1.0 μm,
a hard coating layer having an optical thickness from approximately 2.0 μm to approximately 4.0 μm, and
a back surface multilayer film of the multilayer film including:
a first layer of silicon dioxide with a refractive index of 1.47 and with an optical thickness of 0.100λ,
a second layer of zirconium dioxide with a refractive index of 2.00 and with an optical thickness of 0.150λ,
a third layer of silicon dioxide with a refractive index of 1.47 and with an optical thickness of 0.080λ,
a fourth layer zirconium dioxide with a refractive index of 2.00 and with an optical thickness of 0.250λ, and
a fifth layer of silicon dioxide with a refractive index of 1.47 and with an optical thickness of 0.300λ,
wherein λ equals 500 nm.

12. The spectacle lens according to claim 11, wherein a top surface of the plastic lens base includes:
a primer layer having an optical thickness from approximately 0.5 μm to approximately 1.0 μm,
a hard coating layer having an optical thickness from approximately 2.0 μm to approximately 4.0 μm, and
a top surface multilayer film of the multilayer film including:
a first layer of silicon dioxide with a refractive index of 1.47 and with an optical thickness of 0.150λ,
a second layer of zirconium dioxide with a refractive index of 2.00 and with an optical thickness of 0.080λ,
a third layer of silicon dioxide with a refractive index of 1.47 and with an optical thickness of 0.040λ,
a fourth layer zirconium dioxide with a refractive index of 2.00 and with an optical thickness of 0.500λ, and
a fifth layer of silicon dioxide with a refractive index of 1.47 and with an optical thickness of 0.250λ,
wherein λ equals 500 nm.

13. The spectacle lens according to claim 11, wherein a top surface of the plastic lens base includes:
a primer layer with a refractive index of 1.47 and having an optical thickness from approximately 0.5 μm to approximately 1.0 μm,
a hard coating layer with a refractive index of 1.47 and having an optical thickness from approximately 2.0 μm to approximately 4.0 μm, and
a top surface multilayer film of the multilayer film including:
a first layer of silicon dioxide with a refractive index of 1.47 and with an optical thickness of 0.250λ,
a second layer of zirconium dioxide with a refractive index of 2.00 and with an optical thickness of 0.040λ,
a third layer of silicon dioxide with a refractive index of 1.47 and with an optical thickness of 0.060λ,
a fourth layer zirconium dioxide with a refractive index of 2.00 and with an optical thickness of 0.550λ, and
a fifth layer of silicon dioxide with a refractive index of 1.47 and with an optical thickness of 0.250λ,
wherein λ equals 500 nm.

* * * * *